US012398024B2

(12) United States Patent
Engedal et al.

(10) Patent No.: US 12,398,024 B2
(45) Date of Patent: Aug. 26, 2025

(54) CARGO DETECTION AND TRACKING

(71) Applicant: DIGITAL LOGISTICS AS, Kristiansand S (NO)

(72) Inventors: Torbjørn Engedal, Flekkerøy (NO); Engin Dikici, Columbus, OH (US); Harald Nøkland, Kristiansand (NO)

(73) Assignee: DIGITAL LOGISTICS AS, Kristiansands S (NO)

( * ) Notice: Subject to any disclaimer, the term of this patent is extended or adjusted under 35 U.S.C. 154(b) by 1230 days.

(21) Appl. No.: 16/965,839

(22) PCT Filed: Feb. 1, 2019

(86) PCT No.: PCT/NO2019/050029
§ 371 (c)(1),
(2) Date: Jul. 29, 2020

(87) PCT Pub. No.: WO2019/151876
PCT Pub. Date: Aug. 8, 2019

(65) Prior Publication Data
US 2021/0056497 A1    Feb. 25, 2021

(30) Foreign Application Priority Data
Feb. 2, 2018  (NO) .................................. 20180178

(51) Int. Cl.
*B66C 13/46*    (2006.01)
*G06K 7/14*    (2006.01)
(Continued)

(52) U.S. Cl.
CPC ............ *B66C 13/46* (2013.01); *G06K 7/1413* (2013.01); *G06K 7/1417* (2013.01);
(Continued)

(58) Field of Classification Search
CPC .... B66C 13/46; G06K 7/1413; G06K 7/1417; G06Q 10/087; G06Q 10/0833; G06T 7/13;
(Continued)

(56) References Cited

U.S. PATENT DOCUMENTS 6,356,802 B1 *  3/2002  Takehara ............. G06Q 10/087
                                                    700/214
6,370,222 B1 *  4/2002  Cornick, Jr. ........... G01V 5/271
                                                     378/57
(Continued)

FOREIGN PATENT DOCUMENTS

CN   107150954 A     9/2017
WO   2012161584 A1   11/2012
WO   2015039102 A1   3/2015

OTHER PUBLICATIONS

Chao, Mi, et al. "A ship cargo hold inspection approach using laser vision systems." TELKOMNIKA Indonesian Journal of Electrical Engineering 11.1 (2013): 330-337. (Year: 2013).*
(Continued)

*Primary Examiner* — Nathan A Mitchell
(74) *Attorney, Agent, or Firm* — Knobbe, Martens, Olson & Bear, LLP

(57) ABSTRACT

The invention comprises a sensor unit, and method and system for cargo and personnel detection and tracking. The method comprising the following steps:
detecting, or creating for new CCUs, a unique CCU signature, wherein the unique CCU signature is constructed by analyzing images of the CCU capture by a sensor device, and analyzing the images according to one or more of predefined detection methods, and the analysis providing a combination of one or more descriptors defined by CCU
(Continued)

feature points, contours, dimensions, weight, colour, movement pattern, neighbour CCU feature point, planned travel route or last known location.

21 Claims, 21 Drawing Sheets

(51) Int. Cl.
*G06Q 10/087* (2023.01)
*G06T 7/13* (2017.01)
*G06T 7/246* (2017.01)
*G06T 7/73* (2017.01)
*G06V 10/44* (2022.01)
*G06V 20/52* (2022.01)
*G06V 30/424* (2022.01)
*G06V 40/10* (2022.01)

(52) U.S. Cl.
CPC ............ *G06Q 10/087* (2013.01); *G06T 7/13* (2017.01); *G06T 7/246* (2017.01); *G06T 7/73* (2017.01); *G06V 10/44* (2022.01); *G06V 20/52* (2022.01); *G06V 30/424* (2022.01); *G06V 40/10* (2022.01); *G06T 2207/30196* (2013.01)

(58) Field of Classification Search
CPC . G06T 7/246; G06T 7/73; G06T 2207/30196; G06V 10/44; G06V 20/52; G06V 30/424; G06V 40/10
See application file for complete search history.

(56) References Cited

U.S. PATENT DOCUMENTS

| | | | | |
|---|---|---|---|---|
| 6,873,355 | B1* | 3/2005 | Thompson | F16M 11/18 348/157 |
| 7,095,326 | B2* | 8/2006 | Young | G06Q 10/08 340/572.5 |
| 7,421,112 | B2* | 9/2008 | Calver | G01S 17/89 348/148 |
| 8,571,829 | B2* | 10/2013 | Atlas | G01H 13/00 702/56 |
| 9,177,462 | B1* | 11/2015 | Meyers | G01T 1/167 |
| 10,134,147 | B2* | 11/2018 | Gadi | G06T 7/40 |
| 2003/0048376 | A1* | 3/2003 | Peeples | B66C 13/46 348/373 |
| 2004/0125217 | A1* | 7/2004 | Jesson | G06Q 10/087 348/231.3 |
| 2004/0126015 | A1* | 7/2004 | Hadell | B66C 19/002 382/181 |
| 2004/0222888 | A1* | 11/2004 | Young | G06Q 10/08 340/568.1 |
| 2006/0109106 | A1 | 5/2006 | Braun | |
| 2006/0257005 | A1* | 11/2006 | Bergeron | G01V 5/22 382/209 |
| 2007/0133980 | A1* | 6/2007 | Meyers | G08B 13/1961 348/E5.042 |
| 2007/0165777 | A1* | 7/2007 | Anwar | G01V 5/22 378/57 |
| 2007/0200701 | A1* | 8/2007 | English | G06Q 10/08 340/572.1 |
| 2007/0276619 | A1 | 11/2007 | Sugahara et al. | |
| 2008/0252417 | A1 | 10/2008 | Thomas et al. | |
| 2011/0017693 | A1* | 1/2011 | Thomas | G06Q 10/08 212/270 |
| 2011/0175727 | A1* | 7/2011 | Aikaterinidis | G06Q 10/08 340/540 |
| 2011/0227722 | A1* | 9/2011 | Salvat, Jr. | G16H 40/20 340/539.1 |
| 2012/0059769 | A1* | 3/2012 | Carpenter | G01V 5/271 705/333 |
| 2014/0009259 | A1* | 1/2014 | Blumenthal | G01V 5/22 340/5.8 |
| 2014/0088859 | A1* | 3/2014 | Bachmann | B65G 63/004 701/300 |
| 2015/0172518 | A1* | 6/2015 | Lucas | B60R 1/00 348/148 |
| 2015/0239685 | A1 | 8/2015 | Han et al. | |
| 2016/0184703 | A1* | 6/2016 | Brav | A63F 13/213 463/30 |
| 2016/0189360 | A1* | 6/2016 | Kang | G06F 18/214 378/57 |
| 2017/0242148 | A1 | 8/2017 | Yu et al. | |
| 2017/0357026 | A1* | 12/2017 | Gallagher | G01T 1/169 |
| 2018/0150951 | A1* | 5/2018 | Chen | G06T 7/001 |
| 2018/0157932 | A1* | 6/2018 | Gu | G06N 20/00 |
| 2018/0352198 | A1* | 12/2018 | Raasch | G06V 10/20 |
| 2019/0122173 | A1* | 4/2019 | Souder | G06V 10/82 |

OTHER PUBLICATIONS

Che, Jiahang, Yuxiang Xing, and Li Zhang. "A comprehensive solution for deep-learning based cargo inspection to discriminate goods in containers." Proceedings of the IEEE Conference on Computer Vision and Pattern Recognition Workshops. 2018. (Year: 2018).*
International Search Report for International Application No. PCT/NO2019/050029, dated Jun. 28, 2019 in 5 pages.
Norwegian Search Report for Norwegian Application Application No. 20180178, dated Apr. 29, 2018 in 3 pages.
Extended European Search Report issued for European Patent Application No. 19747303.6, dated Oct. 5, 2021 in 12 pages.

* cited by examiner

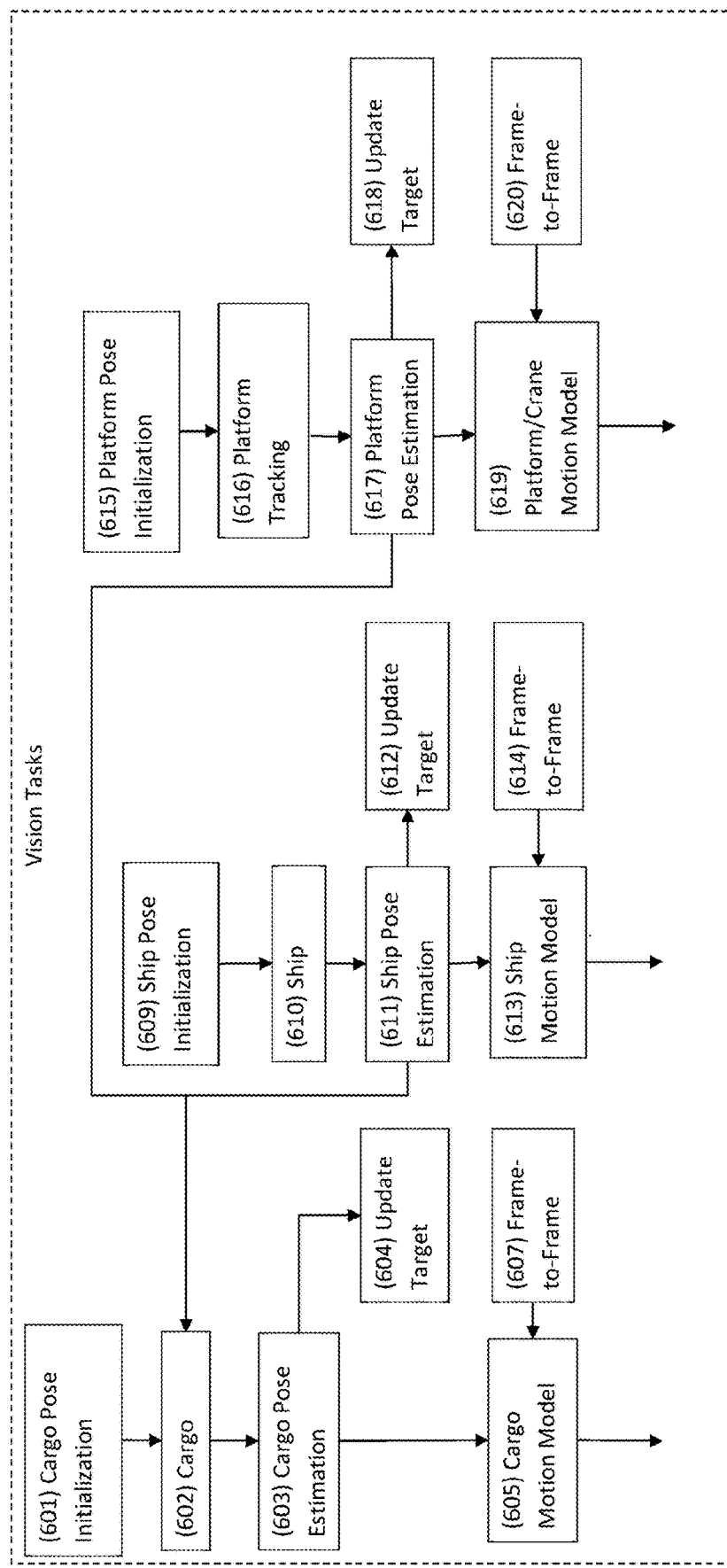
Fig. 11A - Flow chart Overview of the 3D model based tracking of cargo, ship/vessel and platform Fig. 11B - Flow chart of Tracking target initialization (cargo, platform or ship)
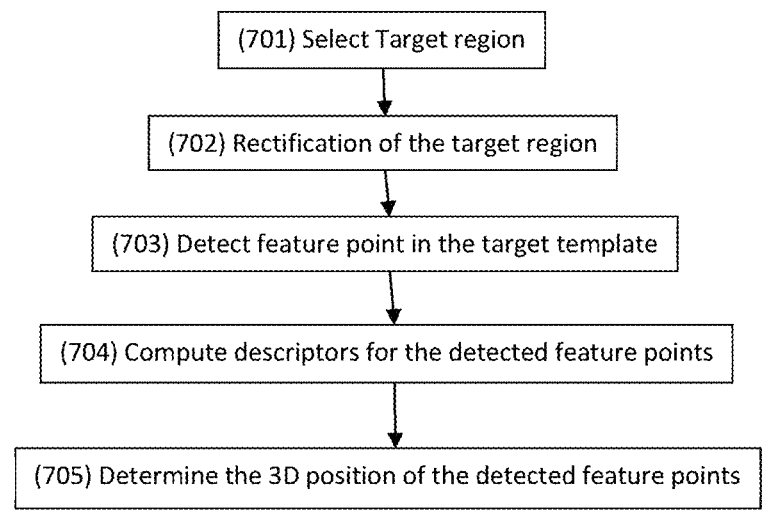
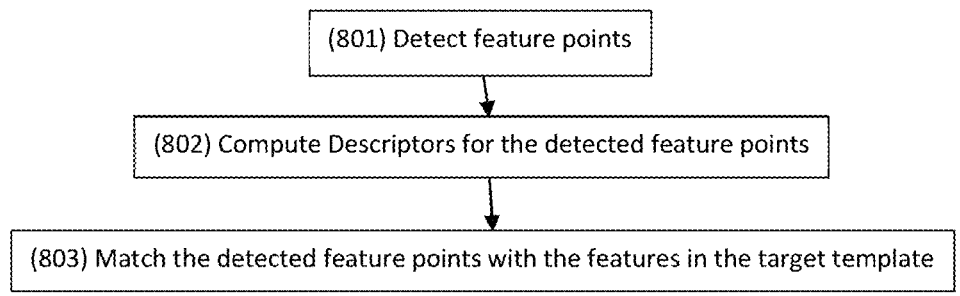
Fig. 11C - Flow chart of Tracking by feature point matching (used for the cargo and ship tracking)

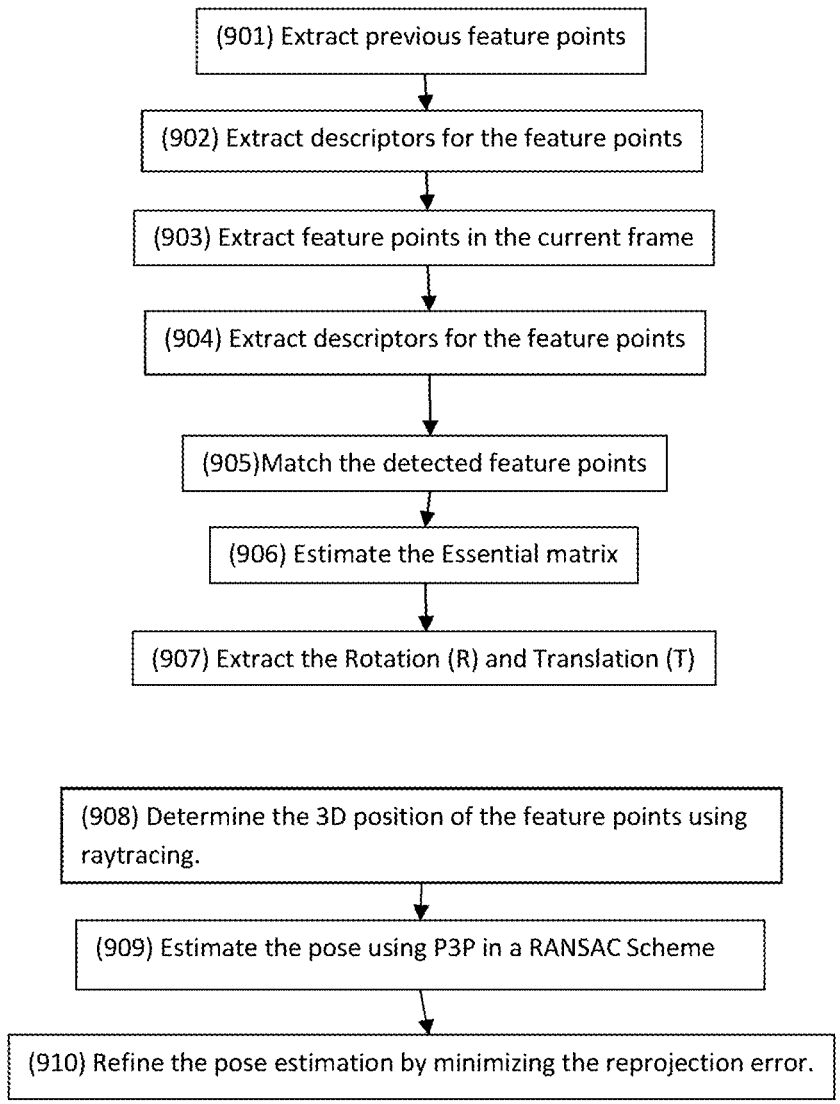
Fig. 11D - Flow chart of Frame-to-Frame cargo tracking

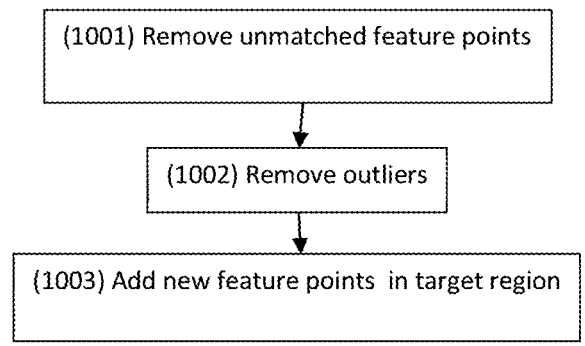
Fig. 11E - Flow chart of Update Target Template
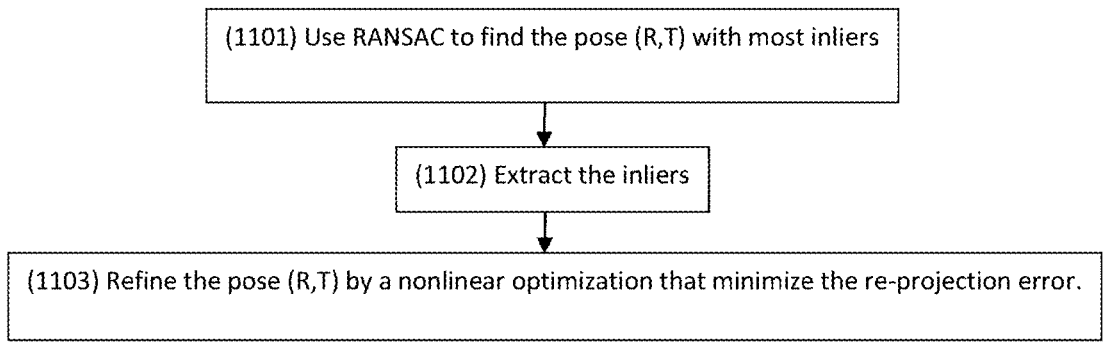
Fig. 11F - Flow chart of Pose estimation used to estimate the 3D position of the cargo and ship

CARGO DETECTION AND TRACKING

CROSS-REFERENCE TO RELATED APPLICATIONS

This application is the U.S. National Phase under 35. U.S.C. § 371 of International Application PCT/NO2019/050029, filed Feb. 1, 2019, which claims priority to Norwegian patent application Ser. No. 20/180,178, filed Feb. 2, 2018. The disclosures of the above described applications are hereby incorporated by reference in their entirety.

FIELD

The present invention provides a sensor unit, a method and system for cargo and personnel detection and tracking.

BACKGROUND

Present invention relates to recognition, identification, maintenance and handling of cargo in loading and unloading operation of cargo, typically used for offshore container tracking, such as when loading and/or unloading containers between platforms or docks and floating vessels, and to execute warehousing related to these cargos. Additionally the present invention may provide recognition and tracking of people close to cargo in movement.

Challenges in such operations are that cargo recognition and identification requires people and/or detector systems on cargo deck/storage area to identify cargo visually or optionally by electronic signalling devices (for example: RFID). The problem is that this is expensive, often high risk (persons in loading area), unreliable and error prone. Visual tags are exposed to wear and tear and thus often not visible due to damage or view is simply obstructed. Cargo may also not be found due to resent unregistered movement of the cargo.

Electronic detectors are often RFID based, which perform poorly if range is larger than typically 8-10 meters. This technique requires advanced technical installations and may not be possible at all to accomplish.

It is further a problem to maintain updated cargo status, such as exact location of cargo and delivery status, on vessels and platforms. Communication between handling entities may suffer from unreliable detection and communication processes. The result may lead to high costs related to floating warehousing, poor logistic planning, decreased deck efficiency, and long delivery times. Other deficiencies may be lack of proper handling of dangerous goods, and misinterpretation of delivery/pickup locations.

A further complication in loading and unloading heavy cargo is the presence of people, and specifically presence of unauthorized persons in loading area. Many accidents and injuries have been experienced due to undetected people activity in a loading area of heavy goods, such as when moving a container by a crane on a ship deck.

SUMMARY

Present invention seeks to eliminate some or all of the above mentioned problems. This may be accomplished by providing a new central server service connected to all cargo handling entities, that being offshore or onshore loading areas such as platforms and container harbour storages, cranes, and offshore vessels, and a unique cargo identification feature, including sensor units and image processing utilities.

In one embodiment of present invention a device, sensor unit, is provided comprising camera and/or laser/lidar capabilities, wherein an image of for example a top view of a cargo carrying unit, CCU, such as a container, is captured. The sensor unit may provide 2D and/or 3D images. A lidar may be a 3D flash solid state lidar or the like.

In a further embodiment of present invention, the sensor unit may comprise a heat sensitive camera, and the image processing features comprise the ability to recognize personnel by its temperature footprint. Using heat sensitive camera on CCUs may add extra distinguishing features to the task of identifying correct CCU. Typical use may be to initiate corrective measures to avoid collision between people and cargo.

A processing device is provided for image processing, wherein the image processing includes creating a unique signature of the cargo, CCU Signature, and recognizes this as a CCU already registered by its unique CCU ID in a client/users logistics system. The location parameters of the CCU are updated based on the processed image, and/or a transport mission of the CCU, for example by loading the CCU to for example a Platform Supply Vessel, PSV. It is thus possible to maintain exact warehousing maps of for example the deck utilization of a PSV, or a number of PSVs.

In a further embodiment of present invention, the image processing comprise further analysis tools for recognition of personnel working in the vicinity of a CCU to be loaded/offloaded, and optionally personnel is categorized as for example authorized or unauthorized, and thereby provide the possibility for various alarm levels to be raised when personnel is for example detected close to a moving CCU.

In a further embodiment of the invention, the image capturing and CCU identifying features may be used for making a detectable/identifiable CCU signature of a CCU by capturing side view images of the CCU. CCU Signatures may be based on side view and top view images and thus provides a more robust identification system, where match on one of the two image directions may identify a specific CCU.

The present invention may also provide a system for registering, maintaining and controlling the whereabouts of CCUs in a logistics system. The system may comprise inventory listings for a plurality of CCU storage facilities, comprising one or more of on shore storage facilities, offshore storage facilities, and vessels such as PSVs. Further the system may comprise a plurality of tools for CCU lifting/moving, such as cranes, forklifts and trucks. Each facility may have installed sensor units for capturing top view images of each CCU being handled, the sensor units are connected to computing resources and optionally to remote logistics system(s). The computing resources are capable of recognizing and identifying existing CCUs, and also able to recognize and introducing new CCUs into the logistics system.

The scope of the invention is defined by the accompanying claims.

BRIEF DESCRIPTION OF THE DRAWINGS

The invention is described by the following detailed description, and is exemplified by the non-limiting details of the following figures:

FIG. 1B-Operational environment overview, crane, cargo and floating vessel

FIG. 11C-Flow chart of Tracking by feature point matching (used for the cargo and ship tracking FIG. 11D-Flow chart of Frame-to-Frame cargo tracking FIG. 11E-Flow chart of Update Target Template FIG. 11F-Flow chart of Pose estimation used to estimate the 3D position of the cargo and ship FIG. 12-Use case 1: Vessel loading at base FIG. 13-Use case 2: Vessel loading offshore FIG. 14-Use case 3: Internal lifting offshore FIG. 15-Use case 4: Planning sailing route FIG. 16-Use case 6: Request available deck space FIG. 17-State/signature structuring FIG. 18-Detection frequency vs time function FIG. 19-Block diagram detect and track CCUs FIG. 20-Examples of inliers and outliers; rectangle and hull FIG. 21-Block diagram Deep Neural Network Based People Detection FIG. 22-Block diagram Network service communication FIG. 23-Collision Course Computation and Alerts

DETAILED DESCRIPTION OF THE PREFERRED EMBODIMENTS

Figure 1A:
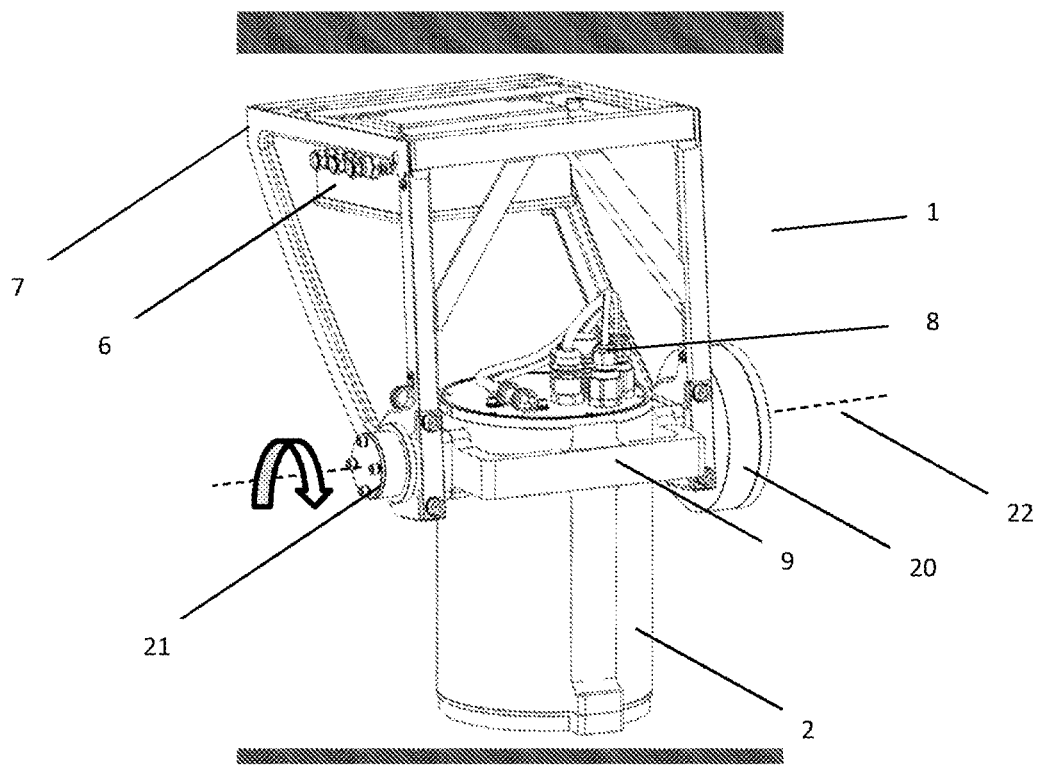
FIG. 1A-B-Sensor unit

The invention is discussed in more detail using specific embodiments as illustrated in the attached figures. It is the intention of the inventors that some or all features shall be able to be utilized in any order or combination, and the figures shall not be regarded as limiting the scope of the invention, but rather as simplified examples for increasing the readability of the description.

The following description is further using some expressions having the following non-limiting meaning:

CCU-Cargo carrying Unit

Back-load-Cargo being returned from an offshore location

NCS—The Norwegian Continental Shelf

PSV-Platform supply vessel

AIS-Automatic Identification System. A radio-wave based identification system for vessels.

CCU ID—The identifier of a CCU (for example alphanumeric), defined by the customer/third party logistics system. It is used as a key for retrieving CCU meta-data from e.g. customers' logistic system. May corresponds to alphanumeric letters painted/visible on the physical CCUs.

CCU Signature—The identifier for CCUs according to present invention consisting of descriptors like feature points, contours, dimensions, weight, color, last known location etc.

Vessel Signature—The identifier for vessels according to present invention, consisting of descriptors like feature points, contours, dimensions, color, AIS identifier etc.

Deck Signature—The identifier according to present invention for loading decks, consisting of descriptors like feature points, contours, dimensions, which installation it belongs to, colors etc.

OptiLift Signature-A common definition of CCU-, Vessel-, and/or Deck Signature.

Onshore base-Supply base located onshore where supply vessels get and deliver load and back-load.

Pose-3D position and orientation with respect to a reference coordinate system Offshore installation-Offshore platform, semisubmersible rig, jack up-rig, FPSO (Floating Production, Storage and Off-loading), FPU (Floating Production Unit).

Loading site-one of offshore, onshore area handling cargo/CCU, the phrase is used in a wide context to identify any place a cargo can be fetched from or delivered to.

Vessel-marine and land vehicle, ship or other transport used for moving goods On-shore crane-Crane used on onshore bases.

Offshore crane-Crane used on offshore installations

Site Server-A server according to present invention located on an offshore installation or an onshore base.

Central Server-A server according to present invention located on shore. Can also be a server application in a cloud-environment.

Master or Master PC—The PC in the crane, connected to the OptiLift sensor unit.

Sensor Unit—The physical sensor unit containing camera, laser, stepper motors etc.

Viewer—If not otherwise stated, Viewer refers to the Viewer application of the software, visible to the crane operator.

RANSAC-RANdom SAmple Consensus is a common robust estimation often used in computer vision and well known by a person skilled in the art Levenberg-Marquardt optimization-provides a numerical solution to the problem of minimizing a function, generally nonlinear, over a space of parameters of the function.

Sobel gradients-edge detection algorithms where an image emphasizing edges is created Bundle adjustment-simultaneously refining 3D coordinates describing a scene geometry In the following scenarios related to cargo transport to/from and offshore platform is used to demonstrate the invention. It shall be understood that the invention may be adapted for being used in any warehousing handling cargo movement between storages and transport vessels. Examples of such alternative environments can, without excluding any, be: Transport of goods between warehouses by truck/car, moving containers between container sites by train/lorry, using airplane to transport cargo between airports. Transport may well encompass relay stations where the purpose is to transfer cargo using a lifting/moving tool between types of transport means, such as a crane moving a container between, for example: train carrier and ship, ship to ship, truck to train and the like.

When the phrase deck map and storage site map is used it should be understood that the phrases shall comprise the meaning of any type of area usable for storing or transporting cargo/CCU, also including, but not limited to: on/off shore container site, ship cargo decks, train cargo decks, truck cargo deck, plane cargo decks, warehouse storage including automatic bay warehouse and belts, drones or other airborne transportation resources, marine cargo transport resources, and others.

When the phrase crane or moving tool is used it should be understood that the phrases shall comprise the meaning of any type of moving tool such as, but not limited to: cranes, forklifts and trucks manually or automatically controlled, bay warehouse lifting means and others.

Figure 4:
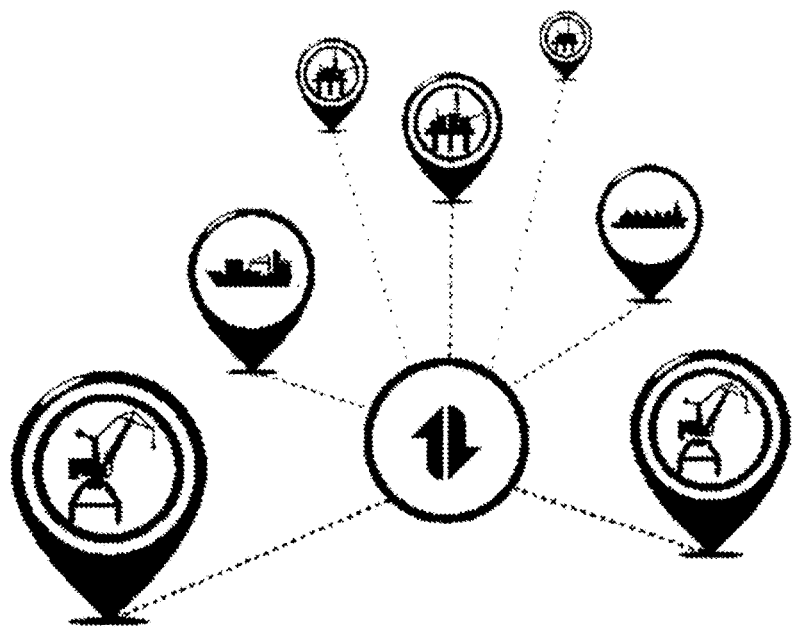

Present invention provides various combinations of one or more sensor units, on-site and/or remote computer resources and network communication services for:
- Keeping track of cargo movements between for example ports, platforms & vessels
- Automatic registration of exact cargo location on individual loading areas and transport vessel decks
- Automatically feeding data into customer logistics system, thereby reducing the need for manual input and tagging of cargo information, by
- Installing sensor units for example at crane boom tips, eliminating the requirements to further instrumentation of the surroundings, and providing a
- Birds-eye-view of deck areas offshore and onshore, and on vessel decks using images from sensor unit A high level system outline is illustrated in FIG. 4.

A user, such as a crane operator, may be provided with data regarding a CCU to be loaded/unloaded to/from a vessel. The user may further be provided with map data of the vessel or area comprising the CCU of interest.

It is also within the scope of the invention to provide a web based solution for providing a dialogue platform for a user hosted on mobile and/or stationary communication units such as for example a smart phone or a PC.

Figure 10:
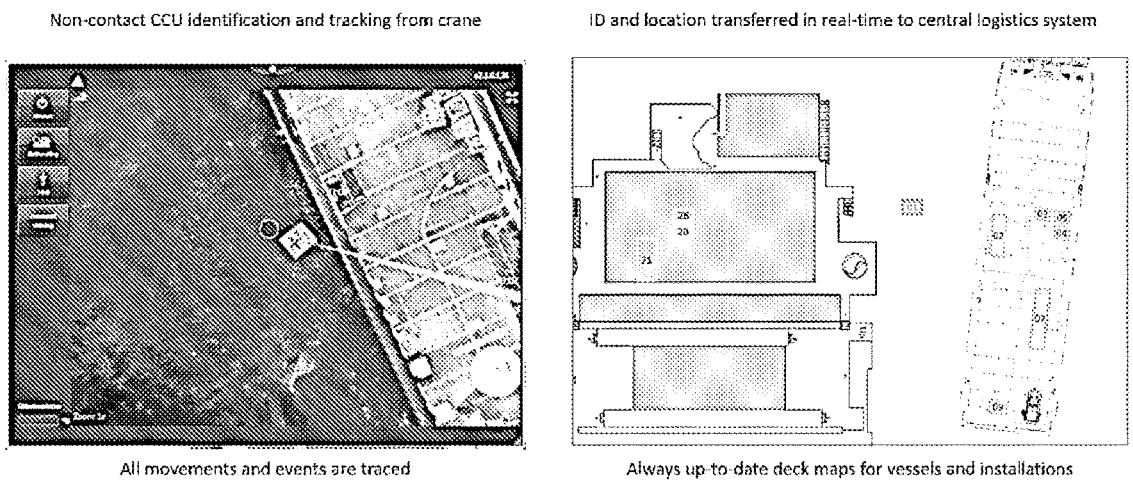

It is further within the scope of the invention to provide a feature for maintaining a correct deck map, identifying correct location of CCU even where storage areas do not comprise sensor units for monitoring and maintaining storage location of CCU. The vessel deck storage area is swiped whenever the vessel passes under a crane comprising a sensor unit as exemplified in image analyzed in FIG. 10, and CCUs in deck is identified and their location is updated. In practice this will mean that the system provided may detect missing or new CCUs when these are brought in detection range of a sensor unit.

The system of present invention may provide user login and authentication.

The system of present invention may provide user configuration and management of settings.

The system of present invention may provide Onshore CCU tracking.

The system of present invention may provide tracking of contents inside CCUs.

The system of present invention may provide Tracking using hand-held devices on/offshore.

Key features of the present invention may comprise all or some of the following:

Cargo Identification:
- Detecting, creating and/or recognizing unique cargo identifier from for example cargo image.
- Cargo image may be a top view of cargo, typical from a camera/detection unit looking down on cargo
- Cargo being located on or close to a known location in a known area, such as on a ship deck with a known layout.
- Cargo may have a pre-stored image profile in a remote database
- Cargo may have a last known location in a defined known area registered in a remote database Cargo Tracking:
- Identifying cargo on area with known layout (map)
- Updating cargo location information when cargo is moved to new location
- Updating remote database with new cargo location and area data Cargo Position Maintenance:
- Use camera/detector unit for continuous monitoring of cargo under camera/detector unit
- Use object recognition and AI/Deep learning to identify cargo identifiers of cargo in area under camera/detector unit
- Maintain location and area info of identified cargo in remote database People Recognition and Tracking:
- Use camera/detector unit for continuous monitoring of area under camera/detector unit
- Use object recognition and AI/Deep learning to identify persons in area under camera/detector unit Analyze Person Status
- Monitor and alert upon person movement in restricted areas
- Monitor and alert upon person movement in collision path with moving cargo Other Features:
- Camera/detector unit comprise a heat sensitive image capturing feature In prior art cargo lifting processes human resources are required to read print codes or scan bar/QR codes of cargo containers, or advanced tracking devices have been deployed on sites and on each cargo for electronic tracking of the cargo. These types of solutions are expensive to maintain, and often put personnel at risk when for example a crane hook is in motion and the crane either fetches or delivers a container.

In order to keep track of the container, there are further challenges in maintenance of correct position of container. For example, when a cargo is moved on deck there may not be a record for this information, and finding correct container may be a time-consuming task.

Figure 1B:
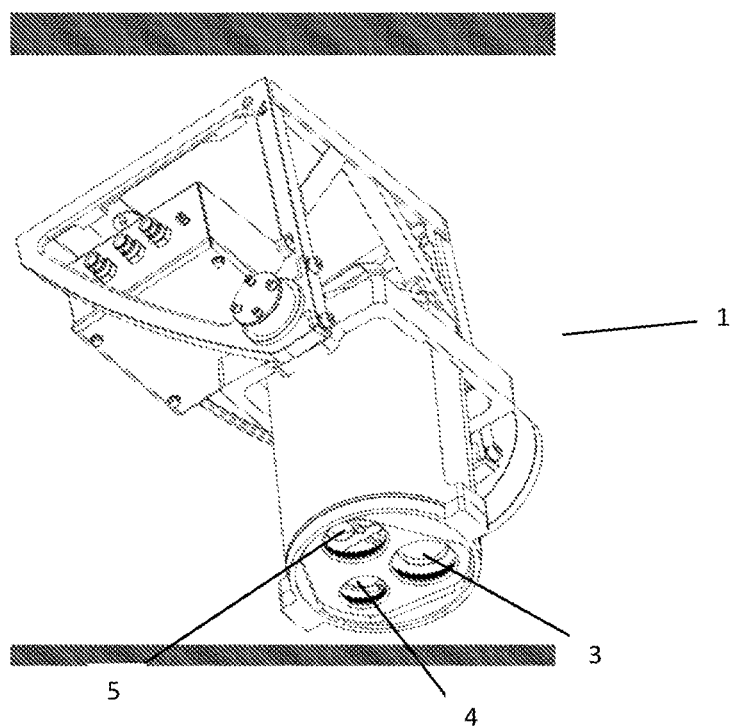
Figure 1C:
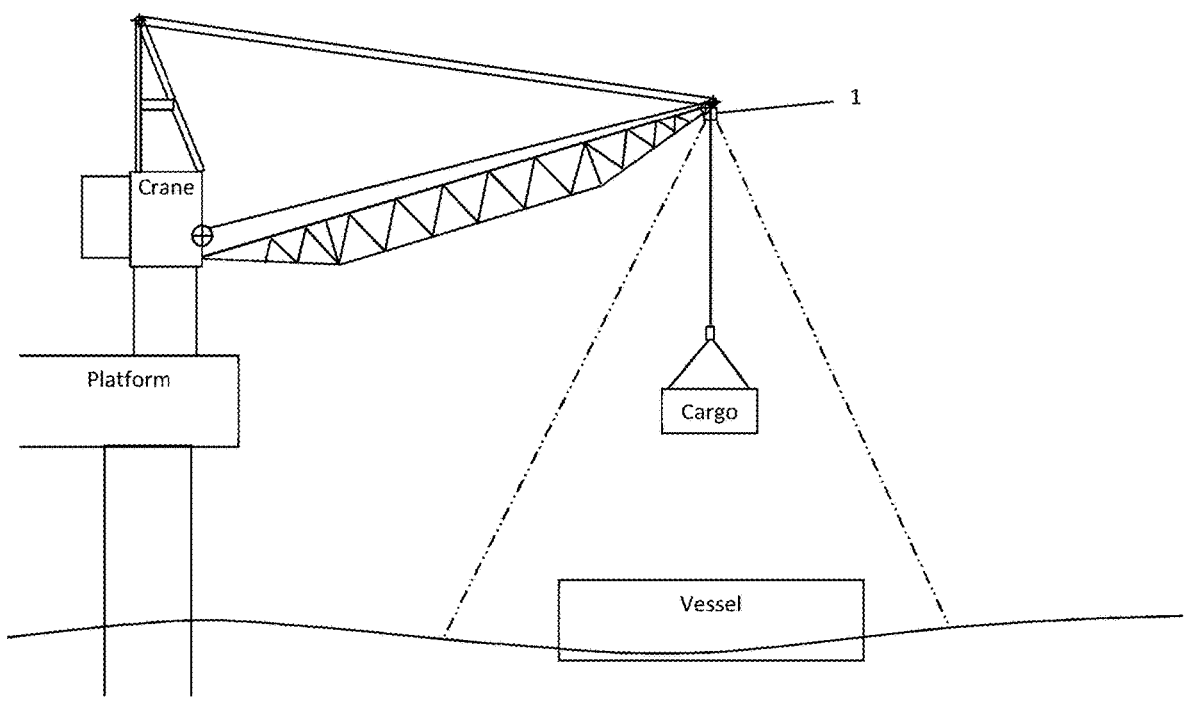

In a first embodiment of the invention a sensor unit is mounted in a crane tip of a cargo lifting crane, such as exemplified in FIGS. 1A, 1B and 1C where a crane is located on an offshore rig, and the crane is lifting a container to or from a platform supply vessel, PSV.

The sensor unit 2 as shown in one example in FIGS. 1A and 1B comprise a sensor assembly 1 comprising attachment means 7, rotational movement means 20, bearing means 21, rotation frame 9, connectors and cabling 8 and a connector box 6. Illustration in FIG. 1B shows an embodiment of the sensor unit 2 comprising a number of apertures for example for camera 3, heat sensitive camera 4, and laser 5. Cabling comprise power, data communication and controlling signals for the instruments 3, 4, 5 and movement means 20 of the sensor unit.

Figure 2:
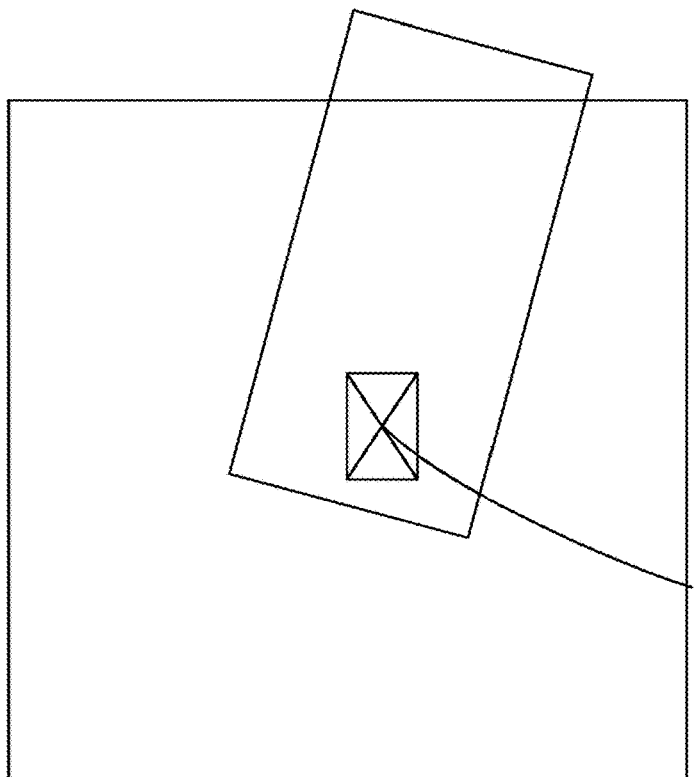
FIG. 2-Schematic view from above under a lifting operation
Figure 3:
FIG. 3-Processed view of an image in the process of identifying for example: feature points, contours, dimensions, weight, color, last known location a CCU signature FIG. 4-System concept overview FIG. 5-Block diagram topology overview FIG. 7-Block diagram system overview FIG. 8-Block diagram of data base and entities FIG. 9-Top down view from crane tip FIG. 10-Top down view from crane tip and mapping information FIG. 11A-Flow chart Overview of the 3D model based tracking of cargo, ship/vessel and platform FIG. 11B-Flow chart of Tracking target initialization (cargo, platform or ship)

When the sensor unit of the present invention is arranged in for example the crane boom as illustrated in FIG. 1C, and from there capturing a continuous stream of images looking down from above as seen in FIG. 2 and FIG. 3, computing resources which are connected to the sensor units and which are receiving the images may continuously process the images. The computing resources may use recognition procedures, for example based on Artificial Intelligence-AI, to analyze image features and recognize known forms, such as container or personnel. The computing resources may then establish an individual CCU signature. A CCU Signature is defined by a unique set of descriptors like feature points, contours, dimensions, weight, color, last known location etc. Present invention will compare each individual CCU Signature, and make a match, with a preregistered CCU ID. CCU ID is the third party's (such as CCU owner) own identifier of the CCU. A CCU is identified by its signature, and this is communicated to the network service on a configurable interval basis or at specific events.

Based on the assumption that each CCU image captured from above in the present invention is unique, and cannot be misinterpreted, the network service system may be updated each time a captured image identifies a previously registered CCU.

Assuming that the computer system connected to a sensor unit of present invention has access to maps of all loading areas, or at least the deck map of all loading vessels able to be participating with the load/unload operation of a CCU to/from the area which the image capturing unit operates from, it may identify and update present position of all CCUs coming into image capturing range of the sensor unit.

In the following the network services is described as the "Central server", the CCU handling service on-site is described as "Site server", and the software applications connected to the sensor unit is described as "Master".

Storage capacity may be provided in all stages of the operation to improve reliability of the information communication between the network based services, the CCU handling sites, and the sensor units.

Figure 5:
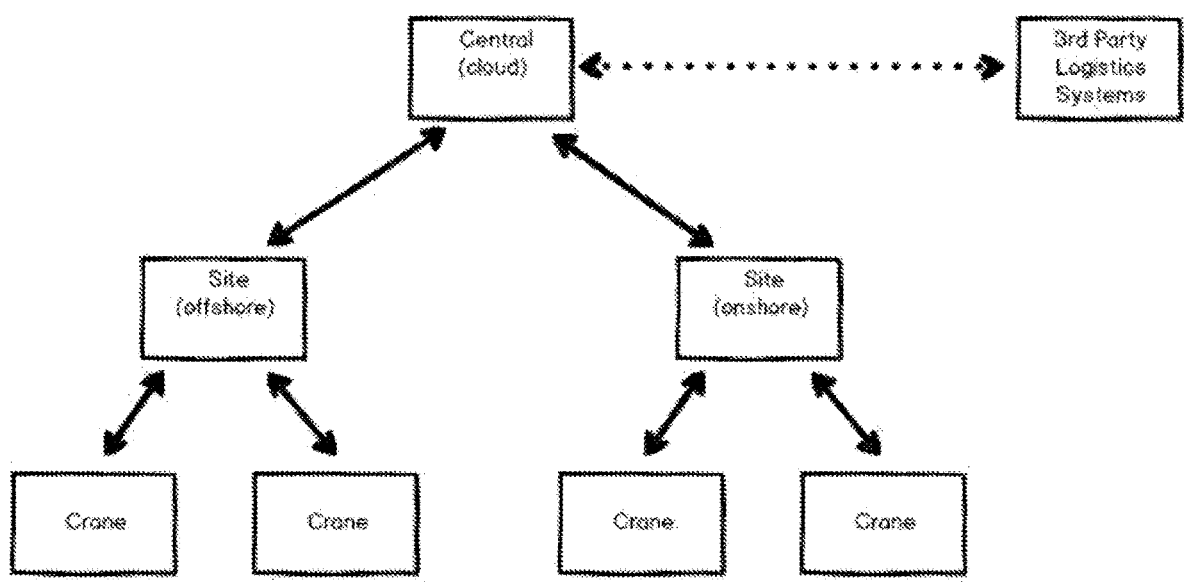
Figure 6:
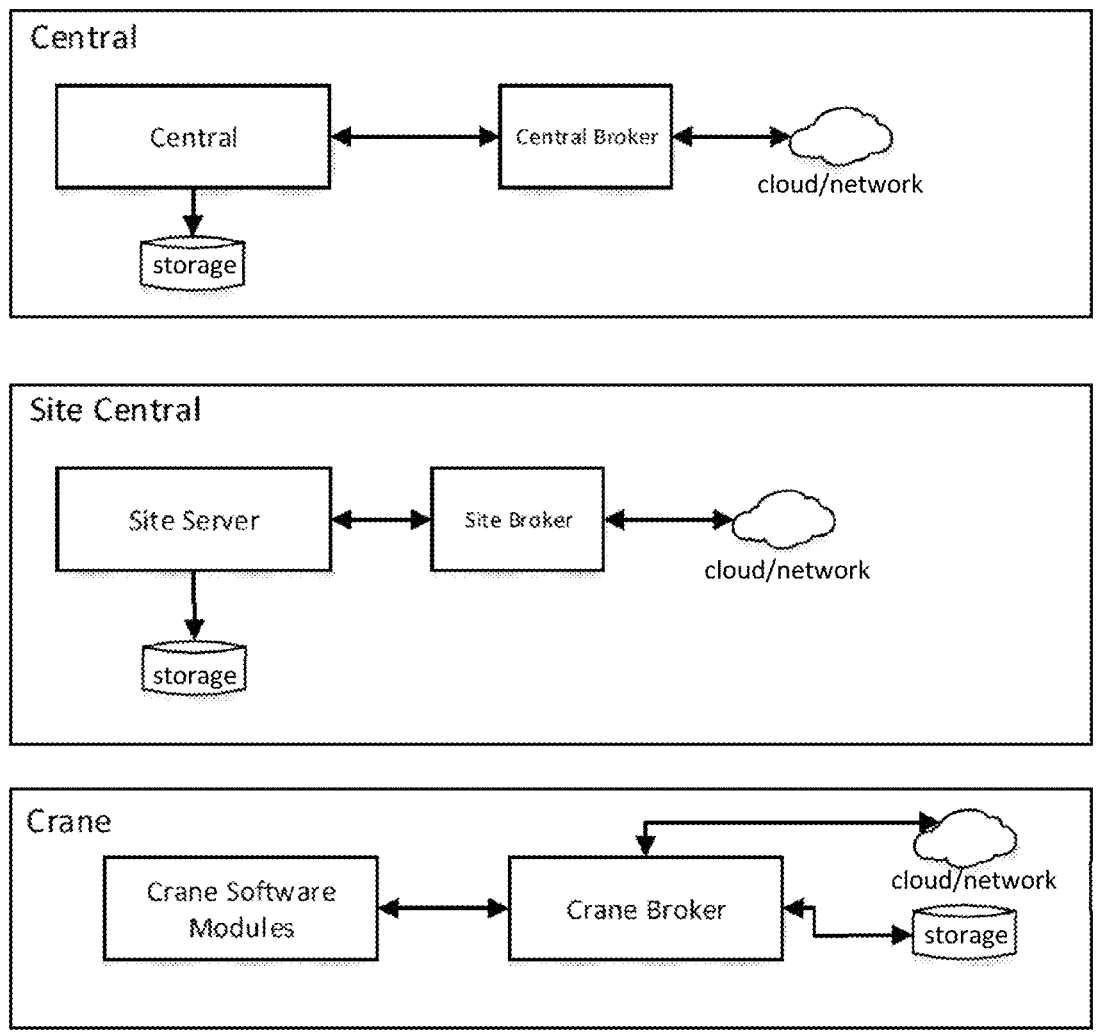

An overview of the information exchange structure, message handling, is described in FIG. 5 and FIG. 6, wherein the system is integrated with existing and/or new external services and providers.

The sensor unit may comprise a camera, optional with heat sensitive features, an IR sensor and/or laser camera/lidar, for image or video capturing. When an image is captured and analyzed, a user, such as a crane operator, may be presented with the ability to select new/unknown CCUs in the image to be identified, tracked, and registered in a database of the network service system.

Using the sensor unit for automatic recognition of labels and/or various "tag" technologies may increase accuracy of the system, and can be comprised by for example: characters are recognized on the CCU, using "OCR"-Optical Character Recognition; or recognizes bar-codes or QR-codes visible to any of the camera connected to the system. Another embodiment example may be provided wherein the invention comprises detectors for communicating/receiving signals for identification from other transmitting sources such as RFID or GPS-devices arranged in combination with cargo or personnel.

The Central server may be facilitated in a cloud environment and providing data mining and maintenance. The Central server may also provide advanced and resource-demanding computing resources. The Central server communicates with Site servers, both onshore and offshore. Site servers may comprise Masters. Masters may comprise image capturing means, such as sensor units described above. Any number of Masters may be comprised in a Site server environment, and any number of Site servers may be connected and comprised in a system maintained by a Central server environment. The number of CCUs may be numerous, and vary over time. CCUs may be introduced to the system on a non-regular basis, and CCUs may be terminated from the system on a non-regular basis.

The provision of an efficient and safe communication environment provides the ability to design a flexible operation environment, for example by moving all crane operator tasks from the physical crane implementation to a control facility arranged remotely from the crane itself. Remote crane operation could be arranged at Site Server or Central Server location or even anywhere reachable by a secure network/cloud connection.

Each Master, such as a crane, may comprise computing means, for retrieval and analysis of images and video streams, for operation control and command handling, operator dialogue, and for communication with the Site servers.

Figure 7:
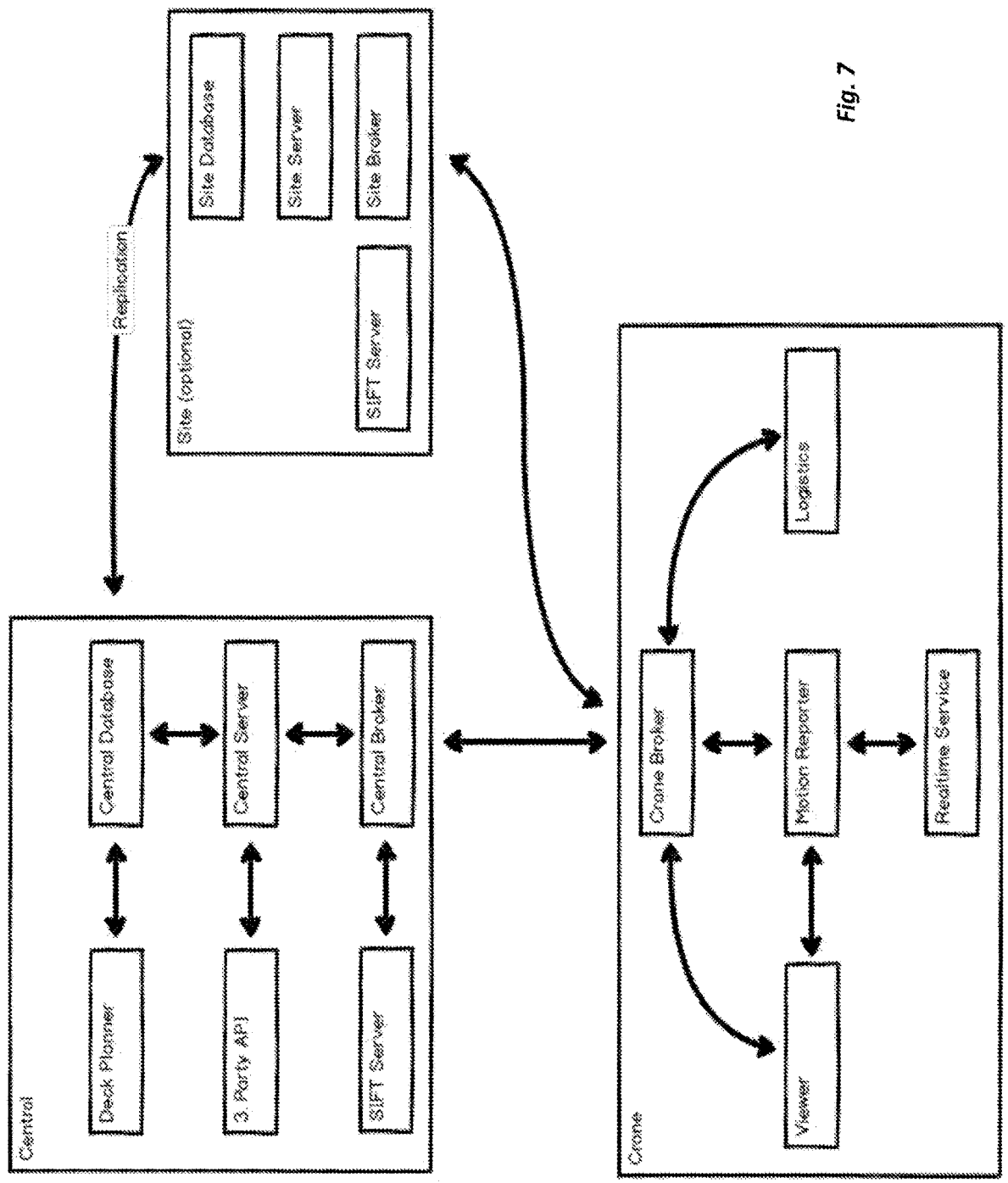

An overall module block diagram of a system according to present invention is shown in FIG. 7.

Figure 8:
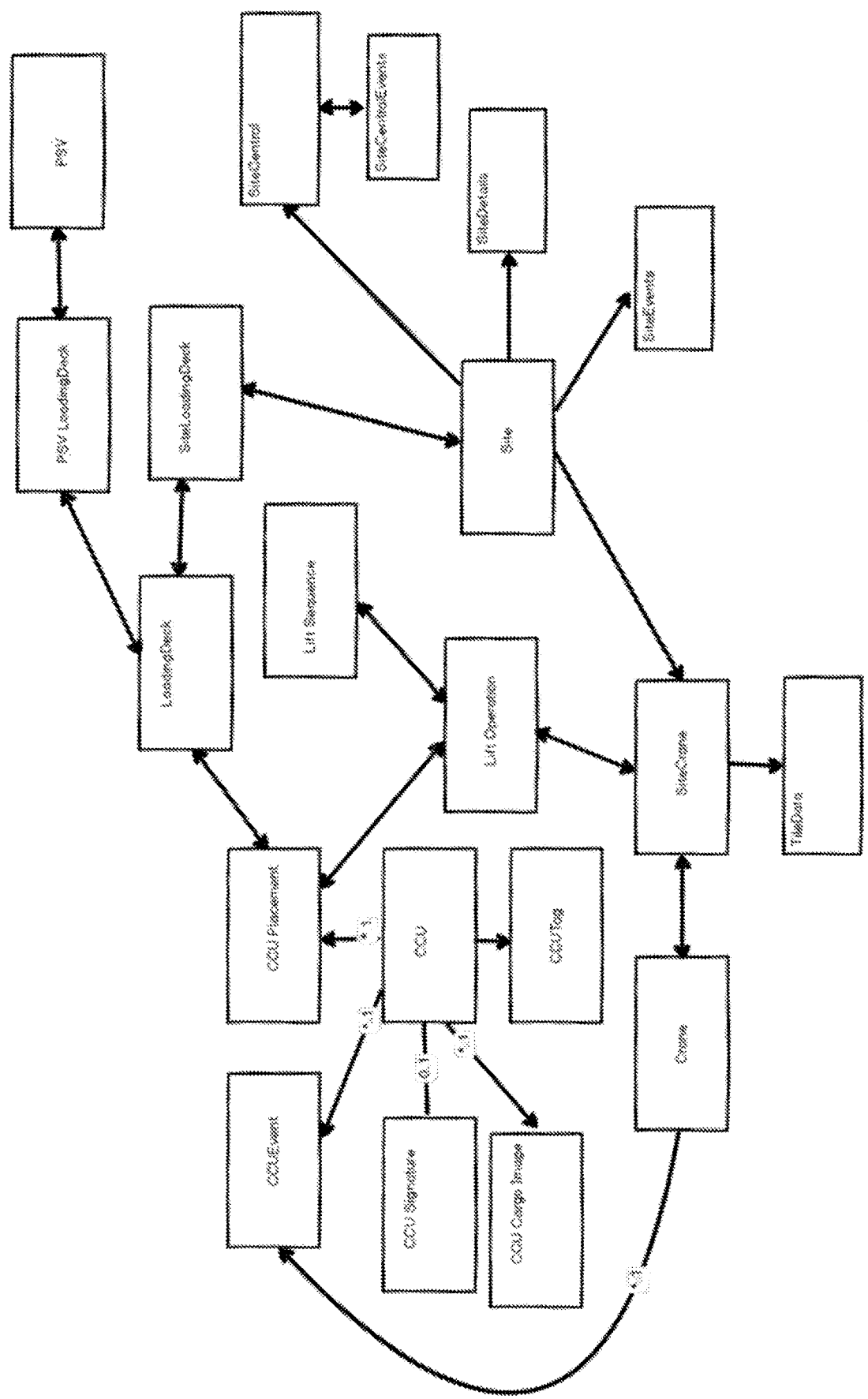

A system database is provided with one or more instances of one or more of the following modules as described in FIG. 8 for data maintenance of:
- PSV (Platform Supply Vessels) each having one or more PSV loading deck
- Site, being a potential storage site of CCUs not being a PSV, can be an offshore platform or an onshore area, having one or more storage areas
- Each site has one or more cranes or means for transporting CCUs, and also means for creating/collecting CCU images The detection and tracking functionality of the system of the invention contains and provides controls for the:
- Cargo detection and tracking operations
- Tracker and model update for platforms.
- Tracker and model update for vessels
- For the cargo:
  - save and load cargo state to a file
  - initialize cargo from image and signature
  - delete cargo, (4)
  - generate cargo signature
  - store cargo signature locally and in database
  - track cargo.
- For the vessel and platform:
  - initialize the model
  - reset the model
  - do tracking
  - update bundle
  - save model to local storage and in database Cargo detection and tracking comprises the major functionalities which are:
- initial detection of cargo
- initialization
- tracking of the initialized cargo for a given frame. These three processes are further defined next.

The FIGS. 11A-11F comprise flow charts for of the tasks related to feature-based 3D object detection and tracking, and also details 3D pose estimation. This method, among others, is used in cargo-, vessel- and platform-detection and 3D pose estimation. The figures are imported from prior art WO2012/161584 with some alterations because the scope of detection is extended to include platform tracking and differences in range measurement device of prior invention being substituted or combined with new sensor unit assembly 1 and the following modified text from corresponding description:

The object (e.g. cargo, vessel, platform etc.) may be tracked using a frame-to-frame tracking method 607, 614. In frame-to-frame tracking 607, 614 the initial target object signature (e.g. CCU Signature) is replaced with the previous frame where the object was detected. The frame-to-frame tracking is robust to small inter-frame variations and improve the estimation of the object pose.

Now, each step in the process where the invention is used in a 3D model-based tracking of objects will be discussed in more detail.

The Feature Pose Initialization (Model based 3D tracking) 601, 609 encompass an input being provided including an image containing the target region (for example the cargo, vessel or platform), and the output of this step in the process shall provide 3D feature points (x,y,z) with (2D) descriptors of the feature points. A step by step process for this is shown in FIG. 11B, and can be described as follows:

701. Manually/Automatically select the target region to be tracked in the image. The selected region is the target template (which may be comprised in e.g. the CCU Signature).
702. Rectification of the target template (such that it is orthogonal against the camera).
703. Detect feature points in the target template.
704. Compute (2D) descriptors for the detected feature points.
705. Determine the 3D positions (x,y,x) of the object feature points using either the range measurement device or estimated distance based on other known/identified objects in the same scene, or using SLAM, SFM, stereovision methods.

The Feature Point Matching (Model based 3D tracking) of a platform, ship or cargo 602, 610, 616 encompass an input being provided including feature points and descriptors for the target or previous frame, and the current frame. The output of this step in the process shall provide matching feature points between the target template and the current frame, and updated feature points and descriptors for the target template. A step by step process for this is shown in FIG. 11C, and can be described as follows:

801. Detect feature point in the current frame.
802. Compute descriptors for the feature points detected in the current frame.
803. Match the detected feature points with the feature points detected in the target template or previous frame.

The Frame-to-Frame Tracking of object encompass an input being provided including the previous frame, the target region in previous frame and the current frame. The output of this step in the process shall provide rotation and translation of the target object between the previous frame and current frame (i.e. the pose change between the frames). A step by step process for this is shown in FIG. 11D, and can be described as follows:

901. Extract feature points in the target region in the previous frame
902. Extract descriptors for the detected feature points in the previous frame.
903. Extract feature points in the current frame.
904. Extract descriptors for the detected feature points in the current frame.
905. Match the detected feature points.
906. Estimate the Essential matrix using the matched feature points (given that 8 or more feature points were matched).
907. Extract the rotation R and translation T from the Essential matrix.

As an alternative to step 906 and 907, the following approach may be used:

908. Using the detected feature points, perform a ray-trace in previous frame to obtain the 3D coordinates (x,y,z) of the matched feature points.
909. Using the 3D coordinates (x,y,z) from the ray-trace and the corresponding 2D coordinates from the current frame, estimate an initial pose (rotation R and translation T) using P3P in a RANSAC-scheme
910. Perform a numerical refinement (e.g. Levenberg-Marquardt) of the pose (rotation R and translation T) from the initial pose from P3P/RANSAC.

The Update Target Signature 604, 612, 618 encompass an input being provided including the object pose, the matched feature points and descriptors and the detected feature points and descriptors. The output of this step in the process shall provide updated feature points and descriptor for the target signature. A step by step process for this is shown in FIG. 11E, and can be described as follows:

1001. Remove frequently unmatched feature point from the target signature.
1002. Remove feature points that are frequently considered to be outliers by the current pose estimator.
1003. Add frequently detected feature point in the target region what is not already part of the target signature.

The Pose Estimation in 3D 603, 611, 617 encompass an input being provided including matched feature points (i.e. matching between the 3D feature point in the target template and the feature points detected in the current frame), and intrinsic camera parameters (i.e. focal length and camera center). The output of this step in the process shall provide the current 3D position and orientation of the object (i.e. a rotation in type of vector map and a translation vector T). A step by step process for this is shown in FIG. 11F, and can be described as follows:

1101. Use P3P in a RANSAC scheme to find an initial pose (R',T') that has the most inliers according to a threshold for the re-projection error.
1102. Extract the inliers (2D/3D correspondences) for the initial pose (R',T').
1103. Refine the pose (R',T') by a nonlinear optimization (e.g. Levenberg-Marquardt) that minimize the re-projection error. Only the inliers are used in the minimization and the initial pose (R',T') is set as the starting point.

In the object Motion Model 605, 613, 619 the object motion model component estimate the current position and orientation of the object. The object motion model may also predict the position of the object based on the old observation and the motion model. Examples of motion models are constant velocity and oscillation behavior. The main tasks for the object motion model is to give a more accurate estimation of the current position of the object and in case of missing observation give a prediction of the current position.

It is possible to track multiple objects in the 2D and or 3D vision methods simultaneously. The depth/distance to each object can then be sampled using the range measurement device, when it hits to each object.

The system performs the initial detection of objects, such as cargo or people for a given camera and thermal image using a multitude of methods. Certain objects of known size can be detected using image analysis with known features, such as containers can be identified using rectangle detection.

Furthermore, Deep Neural Network (DNN) algorithms may be used for initial cargo and people detection. The used DNN may for example be formulated as a region-based convolutional neural network as defined by Shaoqing, Kaiming, *Ross*, & *Jiam*, 2015, but since the DNN and artificial intelligence is rapidly developing, it is within the scope of the invention to take advantage of potential improvements in this technical field.

Figure 21:
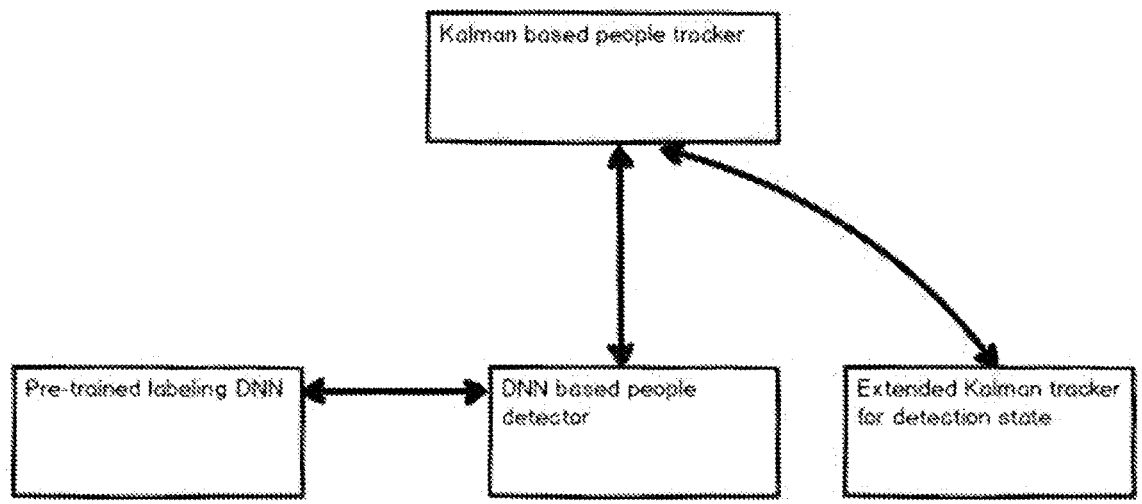

It is further optionally provided a logistics tool that uses DNN to perform initial detection of CCUs and people in a given image. Diagram in FIG. 21 illustrates one possible overview of implementing DNN in people detection and tracking.

The detection of previously registered CCUs may be performed by fusion of various techniques, which is further defined below. The initial detection may be performed as follows:

The aligned camera and thermal images (a given pixel position for the two images refers to similar world coordinates) are passed into a pre-trained DNN. Pre-training of the DNN may be performed via Keras which is an open source neural network library written in Python. The training may be done using pre-labelled datasets manually labelled. The labelled data may include at least three labelling classes:
Cargo
people
everything else.

Figure 9:
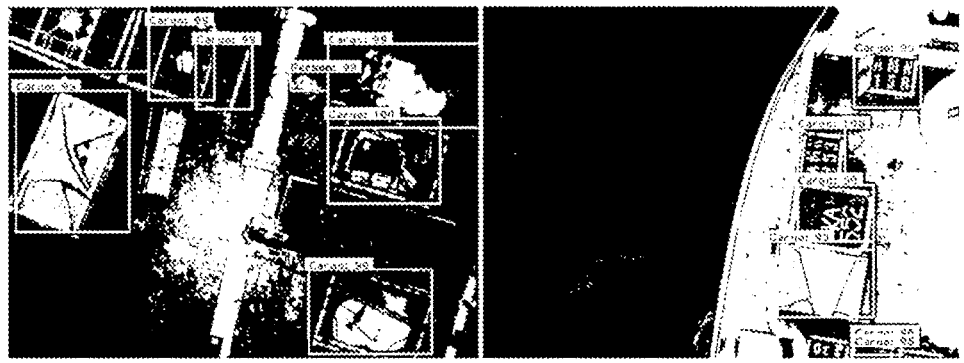

Pre-trained DNN returns image coordinates for the parts of the image that include cargo and people as shown in FIG. 9.

The CCU initialization process initializes the cargo for a given CCU Id, using one or more of:
image
cargo rectangle
camera matrix and template depth
cargo signature Initialization of the cargo via signature comprises a process of loading a binary blob defining the states of various detectors for a given cargo, and the content of a blob is defined below.

Detectors are explained as based on image interpretations, but may also be based on other information sources such as, but not limited to: weight, last known location, movement pattern of cargo and/or deck and/or people, vessel transport route, neighbour container, communication tags, visible labels and other.

The initialization from image is performed as follows:
1. Each detector's initialization method is called with the given image, cargo rectangle, camera matrix and template depth (detectors are defined below). Each detector informs a cargo detection manager with the outcome of its initialization process; some might initialize for the given cargo, some might not (due to too few features, lacking texture etc.).
2. Covariance matrix, C, for the initialized detectors is computed.
3. The estimation variance for C can be found using maximum likelihood as $(1^T C_\square^{-1} 1)^{-1}$. This is the lowest variance of the future tracking for the initialized detectors. If the estimation variance is over a configurable threshold, then the initialization fails. Otherwise, it is a successful initialization for the given CCUId.

The tracking function of the cargo detection and tracking feature may have one or more of the parameters of:
image
camera matrix
pose for the platform and vessel.
SIFT features of the given image
ORB features of the given image
FAST features of the given image
Texture based features of the given image The tracking function of the cargo detection and tracking feature may perform the following operations:
1. Each detector's detection process is called with the appropriate parameters.
2. The results provided by the detectors are fused as below.
3. Detection priorities of the cargos are set based on the detection results as described below.
4. Update process of the position-based detector is called, where the position updates are described below.

A data fusion process is provided which aims to combine detection results coming from all detectors into correct/refined results. The process works as:
1. For each cargo, the detection results coming from all detectors are collected into a list. Assume for the nth cargo, the list is called $L_n$
2. For each member of $L_n$, the image distance (in pixels) of the cargo centre to the other members of $L_n$ are computed. If the distance is smaller than a configurable threshold, then these detections are kept in another list. Assume for the ith member of $L_n$, the list is called $M_{n,i}$.
3. The covariance matrix for the members of $M_{n,i}$ is generated. This covariance matrix is derived as the sub-covariance matrix of a configurable detector covariance matrix. Assume the sub-covariance matrix derived for $M_{n,i}$ is called $C_{n,i}$.
4. The estimation variance of the detectors in $M_{n,i}$ is found using maximum likelihood as:

$$\text{estimationVar}(M_{n,i}) = (1^T C_{n,i}^{-1} 1)^{-1}$$

5. The weights of the detectors in $M_{n,i}$ is also found using maximum likelihood as:

$$\text{weights}(M_{n,i}) = \frac{1^T C_{n,i}^{-1}}{1^T C_{n,i}^{-1} 1}$$

6. Comparing the estimation variances for each $M_{n,i}$, the lowest variance estimation is selected. If the selected item's variance is below or equal to configurable threshold, then for the nth cargo's position is added into the fused detection info list.

If multiple detectors estimate the location of a cargo with very similar center positions, then all these estimates would produce similar estimation variances. In this situation, the weight of detectors is compared to select the estimate coming from the most reliable detector.

Figure 17:
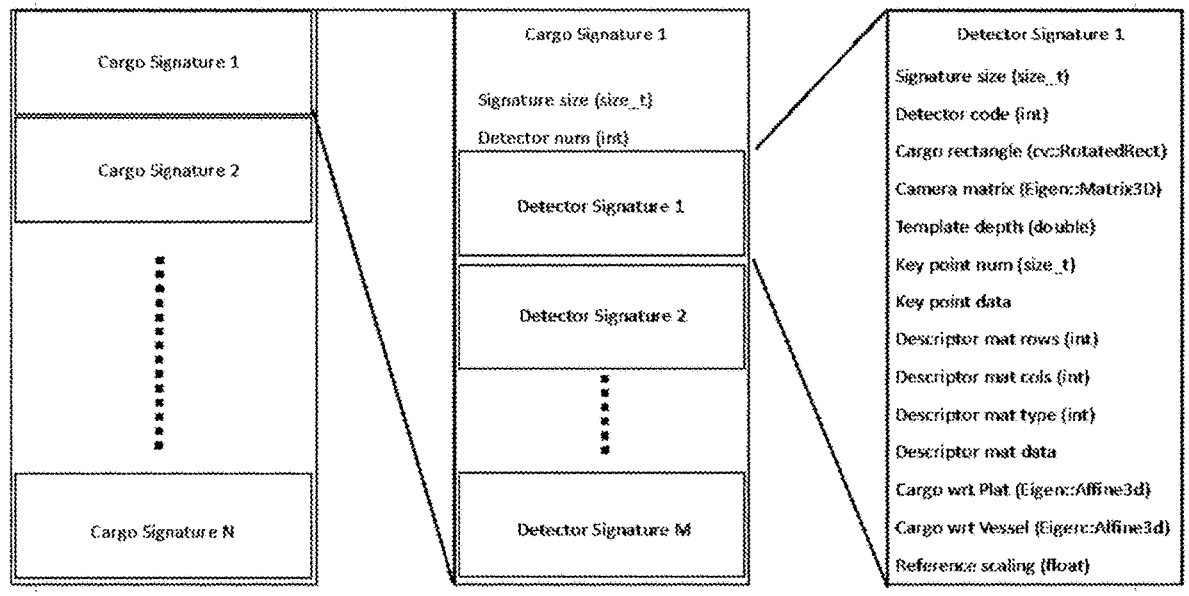

Cargo detection manager can save and load its state to and from external file and binary blobs. A state file may have a structure as shown in FIG. 17. A cargo signature part of the state may be kept in the database for each cargo. The cargo detection and tracking feature may be defined to load the signature as much as it can, and reporting the incompleteness if any is detected, with the initialized detectors, allowing the utilization of signatures even when the new detectors are added into a detection portfolio. Hence, it may be backward compatible. The signatures may be serialized/deserialized into the CCU Signature type.

Figure 22:
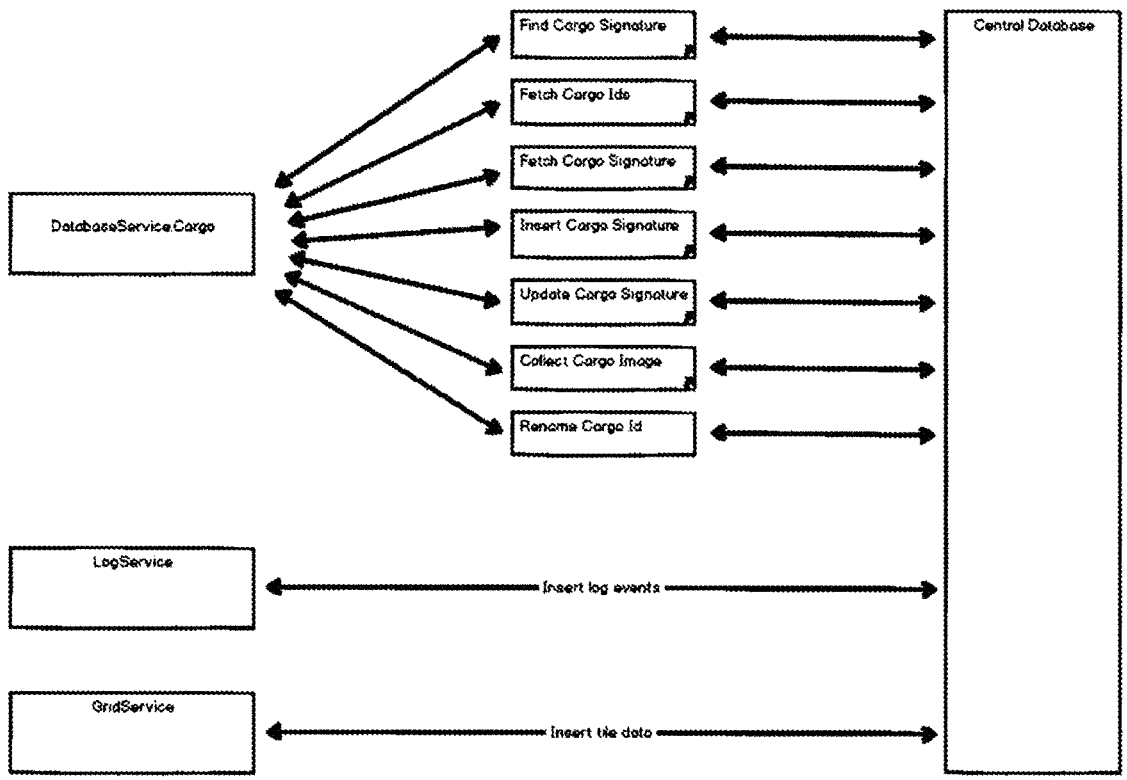

One optional implementation of a database maintenance system is illustrated in a high level flow chart in FIG. 22.

The cargo detection and tracking feature uses a prioritization feature to ensure that the system can perform tracking of high numbers of cargo, while minimizing the performance reduction due to high load. The prioritization feature may determine the cargo id's that should be detected for the given image frame. It achieves that by first setting:
1. High detection frequency
2. Low detection frequency
3. Transition time from a configuration file.

Figure 18:
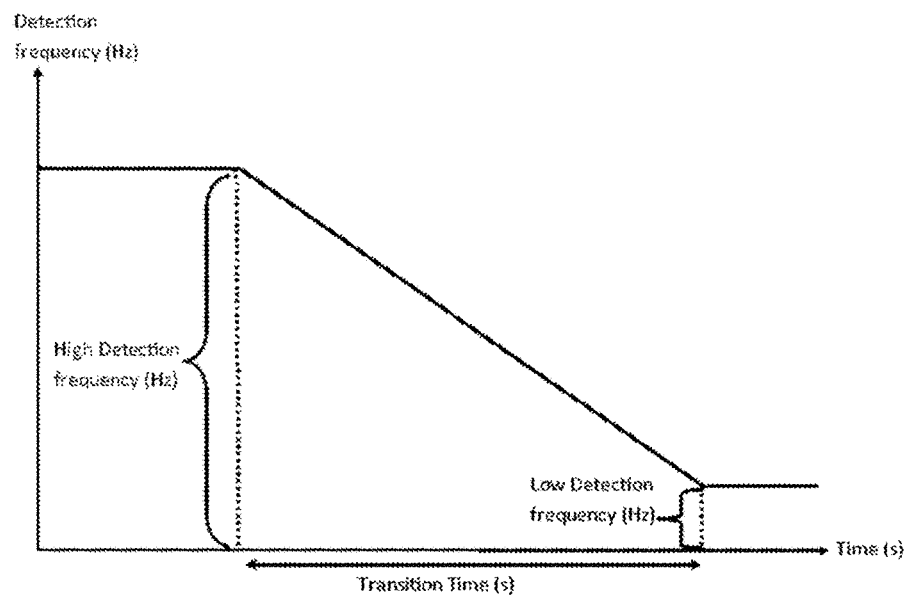

Each cargo holds a detection frequency value, which varies between the high and low detection frequencies. Whenever a cargo is initiated or detected in a frame, its detection frequency is set to the high detection frequency. For the frames where the cargo is not detected, the detection frequency is reduced by a linear function, shown in FIG. 18.

Figure 19:
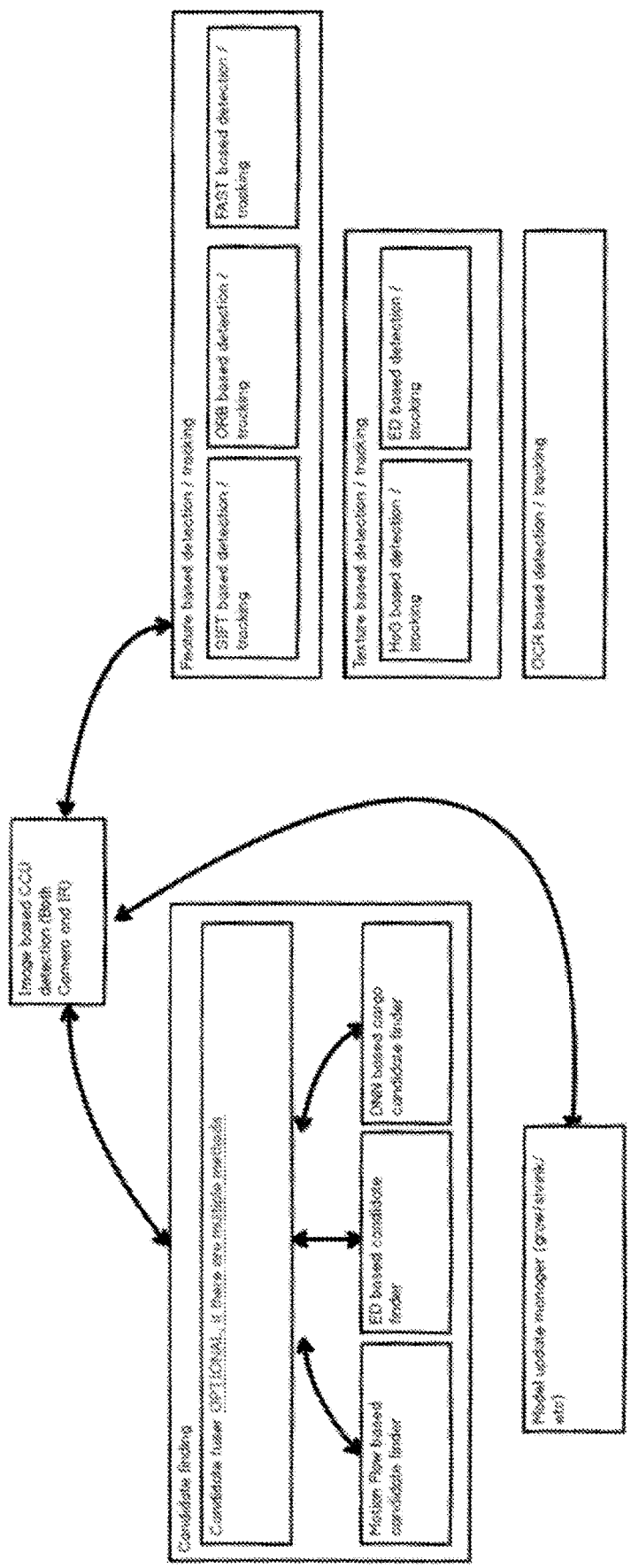

The computer system connected to the sensor unit may analyze the image or video stream, and detect and track CCUs as described in FIG. 19 for example in accordance with, but not limited to, one or more of:
- feature-based-detection
- texture-based-detection
- position-based-detection Logistics currently offer three preferred types of-based-detectionfeature-based-detection, but is not limited to these as the method is not limited to any specific type of-based-detectionfeature-based-detection and may use any existing or future methods:
1. SIFT: Scale invariant feature transform
2. FAST: Features from accelerated segment test
3. ORB: Oriented FAST and rotated BRIEF The process method of thefeature-based-detection may be set up to perform the following for each initiated cargo:
1. Get the matches between the cargo and image feature descriptors.
2. Compute the constrained transformation based on these matches using RANSAC followed by for example a Levenberg-Marquardt optimization.
3. Compute the cargo feature inliers/outliers based on this transformation.
4. If the inliers are over a configurable threshold, OR the cargo is detected in the previous frame with a close position, wherein closeness is defined via defined thresholds, and there are for example at least three inliers, then add the cargo into detected list. Then, update the cargo template based on the inliers/outliers (further described below).

For each detected cargo, a CCU signature may be updated according to the following:
1. Update the matching information: The task updates the total numbers of matched/unmatched frames for the existing and candidate feature points (1) the point is located in the current image frame, (2) the cargo with lower depths do not block the view of this point, and (3) acquisition intensity of the point is not significantly different from its previous observations. The second objective is achieved by checking the fused/final cargo detection results from previous frame for the rendering positions of cargos with smaller depths.
2. Generate new candidate features: The task adds candidate feature points. The candidate feature points can be coming from the inside of a cargo rectangle (if a detection algorithm is set to "Rectangle"), or from the inside of a hull defined by the inlier features (if a detection algorithm set to "Hull"). See FIG. 20.
3. Set the feature points: The final task pruning the feature points that are not matched over configurable number of frames, and grows the template with the candidate template points that have been matched over configurable number of frames.

Figure 20:
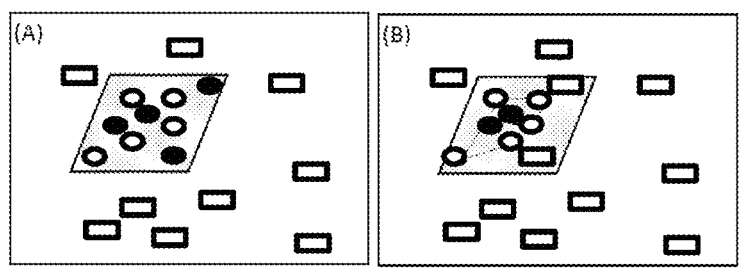

In FIG. 20 "O" are the inliers and "." are the proper candidates for (A) detection algorithm=Rectangle, (B) detection algorithm=Hull.

Texture based detection method treats the cargo as a single feature where the descriptor is defined using the texture of it, and detects the texture during the tracking. The texture may be defined using, but not limited to, the following algorithm:
1. The edges in the cargo rectangle are detected using for example the Sobel gradients.
2. The detected edges are sorted with respect to their magnitudes.
3. The sorted list traversed from top (beginning from the highest magnitude), and configurable number of edges in the list are kept with the constraint of kept edges cannot be closer than a configurable number of pixels to each other. The final kept edges define the texture.

The tracking may then be performed for a given image and cargo as follows:
1. The Sobel gradient of the image is computed.
2. For each pixel positions with gradient magnitude over a configurable threshold, all cargo edges are traversed. More explicitly, the hypothesis that the cargo edge is located on the pixel position is assessed by orienting the template to align the gradient directions, and computing the fit for the rest of the contour points. The total acceptable alignment error is configurable; hence, the test of contour fitting onto a given position might take only few comparisons before aborting.

It should be noted that the texture based detection method provide a rotation invariant detection. However, the scaling is not handled during the above procedure. To handle scaling properly, various scales of the template should be matched to the image. Due to performance reason, the texture based detection method tests a different scale for each frame. If a template match happens, it keeps using the found scale until it loses the tracking. When a tracking is lost the texture based detection method seeks to match different scales in the following frames. The scale adjustment percentage may be configurable.

Position based detector provides two main processes; detection and update.

Detection process computes the cargo position with respect to the camera, based on stored pose information. Update process refines the cargo position with respect to the vessel and platform. Accordingly, the detection process is called with the detection methods of all other detectors by the cargo detection and tracking feature and the update process is called right after the detection.

Update process takes place after the detection process, where the final detection results are used for refining each detected cargo's position with respect to the vessel and platform. For each detected cargo, the update process:
1. Resets the cargo with respect to vessel and, cargo with respect to platform transformations.
2. If the vessel is seen, compute the cargo with respect to vessel transformation as:

$$cargoWrtVessel = e \cdot cargoWrtCamera$$

3. Similarly, if the platform is seen, compute the cargo with respect to platform transformation as:

$$cargoWrtPlatform = platformWrtCamera^{-1} \cdot cargoWrtCamera$$

The detection process uses the information refined in the update process to estimate the location of cargo with respect to vessel or platform. For each cargo,
1. If the vessel is seen, then it estimates the cargo's position with respect to camera as:

$$cargoWrtCamera = vesselWrtCamera \cdot cargoWrtVessel$$

2. Similarly, if the platform is seen, then estimates the cargo's position with respect to camera as:

cargoWrtCamera=platformWrtCamera·cargoWrtPlatform

Image collection logic determines that the image is collectible based on a cargo's position with respect to the camera, and the iris opening. Accordingly, any of the following three conditions trigger an image collection:
1. The cargo's position with respect to camera has a translation over a configurable threshold, with respect to previously collected images for this cargo.
2. The cargo's position with respect to camera has a rotation over a configurable threshold, with respect to previously collected images for this cargo.
3. The iris opening has changed over a configurable, with respect to previously collected images for this cargo.

Figure 23:
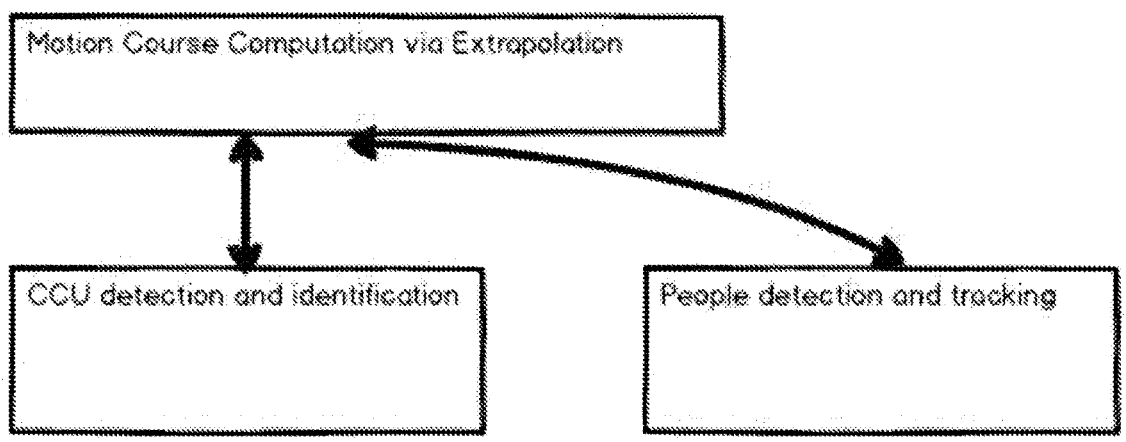

Collision is avoided by CCU detection and identification, people detection and motion course computation via extrapolation of detected motion as outlined in diagram in FIG. 23.

Duplicated cargo signatures will be found locally by checking the proximity of all tracked cargos in each image. If two or more cargos have almost the same image position (within for example 10 pixels), they are considered to be duplicates of the same cargo.

Duplicates may be removed locally according to for example the following priority:
1. If only one item has a temporary Id (starting with e.g. "nnnn-"), remove that one. This happens when an Id has been manually updated to a real Id in the database.
2. If both items have a temporary Id:
   a. If only one of the Ids was invented here, remove that one. This may happen if a user selects an already tracked cargo.
   b. If both were invented here, remove the newest. This may happen if a user selects an already tracked cargo.
   c. If neither was invented here, database must be updated. Remove second in list. This happens if database contains duplicates created at other sites/cranes.
3. If both items have a real Id, database must be updated. One alternative is to remove second in list. This may happen if database for example contains duplicates created at other sites/cranes.

Now six different use cases will be discussed in as described in FIGS. 11 to 16.

The system and/or the data may be used by the following group of users:
Using the systems directly:
  a. Crane operators onshore
  b. Crane operators offshore
Using data produced by the system:
  a. Material coordinators offshore (store keeper)
  b. Offshore logistics leaders
  c. Onshore logistics personnel at base, planning sailing routes and cargo on supply vessels.
  d. Onshore logistics personnel/material coordinators at operator companies, following up work orders and equipment (rented or purchased)

Figure 12:
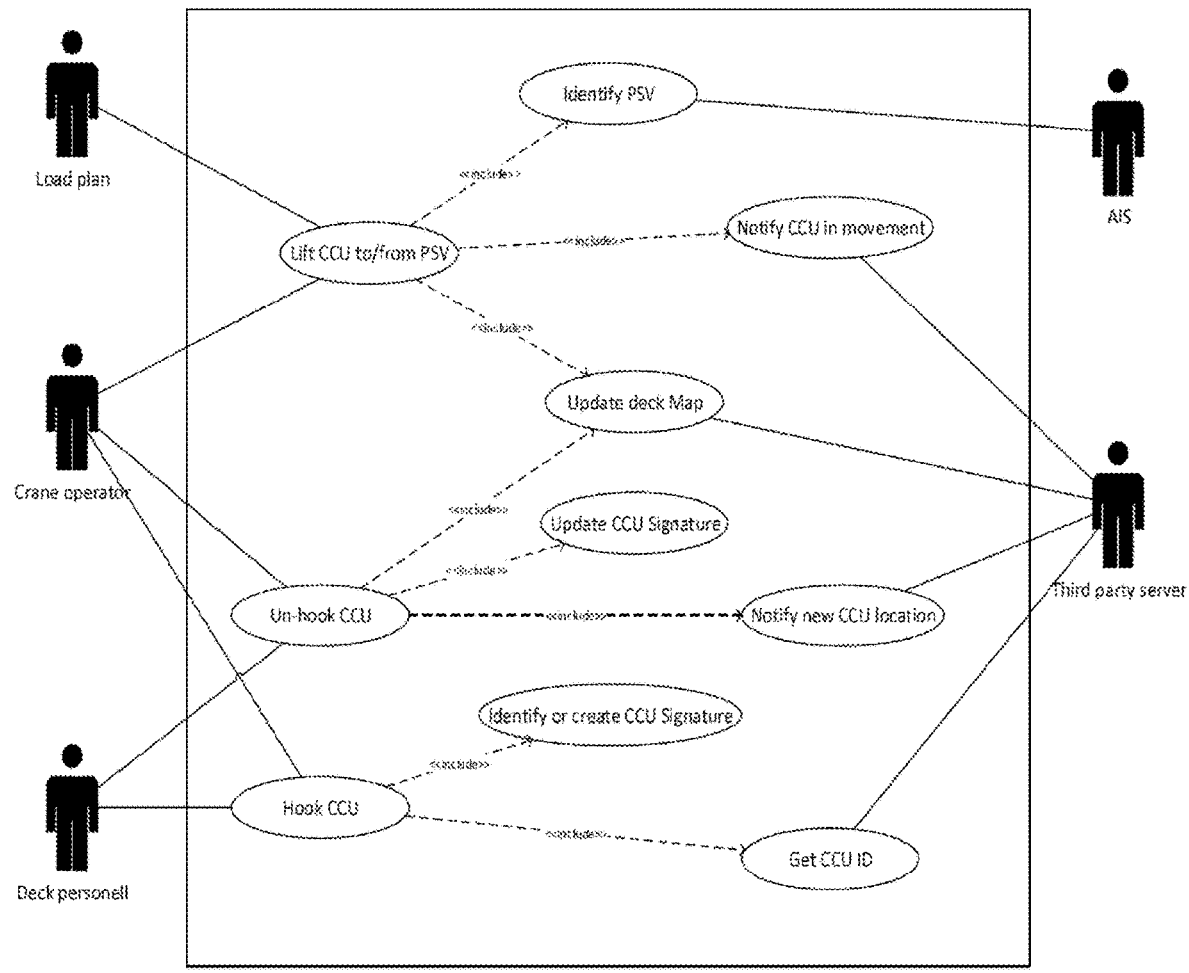

FIG. 12 describes a scenario where a vessel is loaded and unloaded at an onshore base.

The figure defines five different entities, these being a load plan which is set up in advance of loading operation, an AIS which might be an Automatic Identification System, for example a radio-wave based identification system for vessels. The crane operator is an on-site or remotely located person or function operating a lifting/moving equipment, for example a crane operator and the instruments being associated with crane operation and sensors for collecting information of the loading area, for example cameras and lasers in the sensor unit. Third party server comprises a data management system which may provide or receive one or more of relevant data for CCU, location of CCU, platform or vessel maps, and on shore base information. Deck personnel being personnel or automated machinery handling manual work related to cargo handling on vessel deck or other storage areas.

The process is comprised of several independent operations, wherein the identification of a vessel, such as a Platform Supply Vessel, PSV, triggers a predefined load plan to be identified for the identified PSV.

Identification of vessel and or cargo is dependent on having correct scale or distance. Having correct distance may solve the scale if one of cargo or deck is known. If cargo or deck is known scale can be calculated by measuring pixel ratios on various cargo measures or ship boundaries. Present invention utilize more than one mechanism for defining correct scale. Alternatively can any type of object/area with known dimension may be used for calculating all other dimensions.

The PSV may be identified by signaling over radio communication its signature, or a sensor unit may capture an image which is analyzed and PSV id recognized, or the correct PSV identity is manually inputted to the system.

Once the PSV is identified and load plan is established, the activities will be related to one of: loading a CCT onto the PSV, loading a CCU off the PSV, moving a CCU on the PSV or monitor deck and updating the present deck map.

The latter, monitor deck and updating the present deck map, does not necessarily involve moving a CCU, but a continuous operation for ensuring that the deck map is updated and mirrors the actual location of the different CCUs on deck. Each time a CCU is captured on image, and the processing recognized the CCU signature, its physical location is recognized and compared with the deck map stored in the system. If there is a mismatch between the registered and the real location, the database is updated to mirror the actual physical location.

When the load plan identifies a lift of a CCU from the PSV, the location is fetched from the deck map, and when CCU is in view of the sensor unit, an image of the CCU is processed to find the CCU Signature. If CCU signature finds a related CCU ID in the database, the CCU is hooked, lifted and reported as in movement. If the CCU ID could not be found, the CCU ID would need to be created in the system. This may be achieved by importing correct CCU data from labels or other, manually or automatically. If the CCU is new to the system, the CCU signature is stored with the CCU ID and relevant data in the system.

When the CCU is in movement, the system may notify third party server that the CCU is moving.

When the CCU has been moved to a planned destination, and is un-hooked, the deck map may be updated with the new position of the CCU, either on the deck of the PSV or on shore. Either way the deck plan is updated.

The sensor unit arranged in lifting equipment may continuously monitor all CCUs coming into the aperture view of the camera(s) or sensors in the sensor unit. Each CCU is analyzed and CCU signature established and checked with deck map. If inconsistency with expected location of the CCU is detected, the deck map may be updated.

Figure 13:
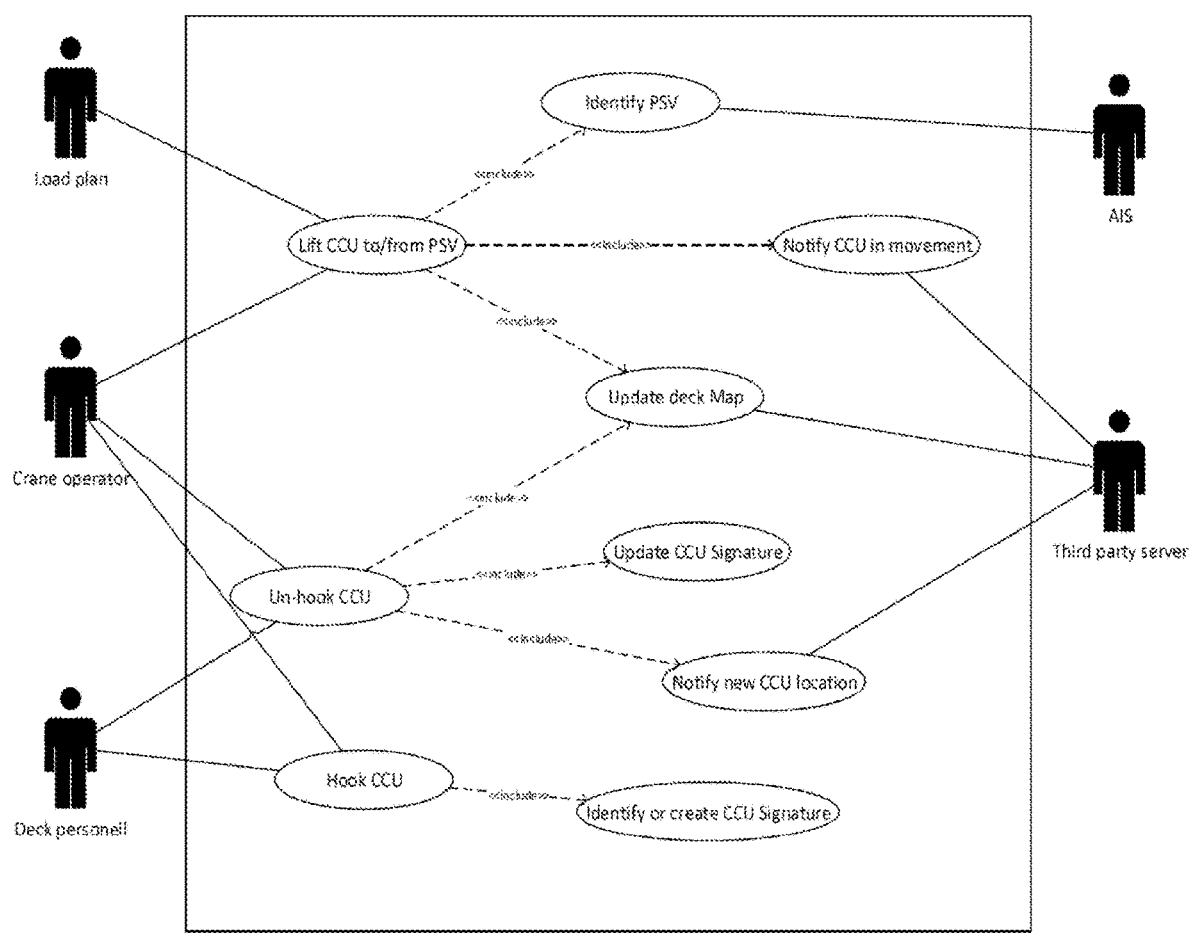

The scenario in FIG. 13 describes a vessel loading to or from a PSV offshore, either between PSVs or between a platform and a PSV. This scenario is similar to the scenario described in FIG. 12, with the exception that when the PSV is identified and deck map is loaded, it may be assumed that no new CCU IDs is detected. However new CCU signatures may be found and established for CCU's processed by the sensor equipment for the first time. A CCU which has not been processed by the image processing of the system will not yet have any CCU signature associated with the CCU ID. When a "new" CCU is hooked by the crane, the image of it is captured by the sensor unit, and a CCU Signature is created associated with a pre-stored CCU ID, automatically or with manual input. When the CCU is un-hooked the new position is registered, and deck map is updated. CCU Signature is also updated.

Figure 14:
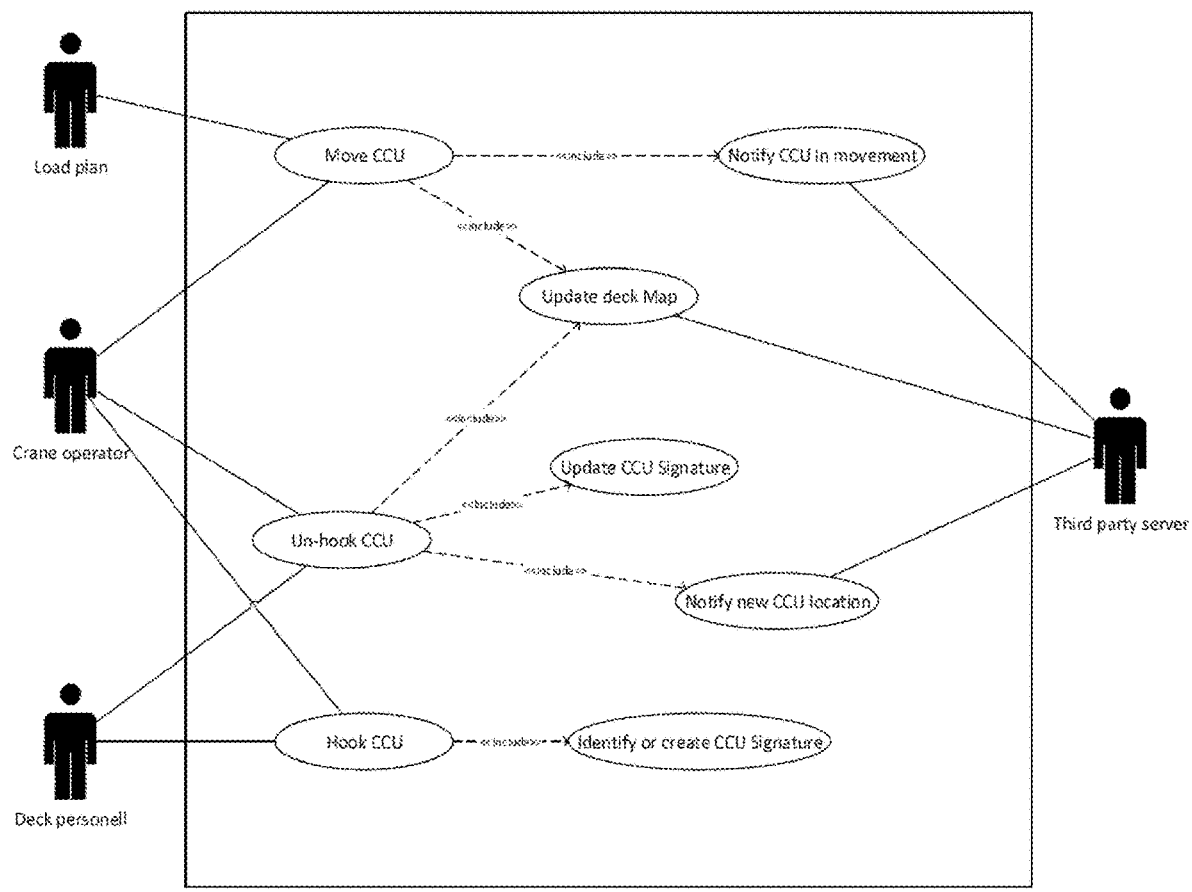

When a CCU is undergoing an internal lifting offshore as described in FIG. 14, the operation comprises the establishment of a load plan, and retrieving a deck map. When identified CCU for movement is found and hooked, a third party may be notified that CCU is in movement. As previously defined the CCU signature is established once the CCU is hooked, and when the movement operation is finished by the CCU being unhooked, the deck map at third party is updated. When a "new" CCU is hooked by the crane, the image of it is captured by the sensor unit, and a CCU Signature is created, automatically or with manual input. When the CCU is un-hooked the new position is registered, and deck map is updated. CCU Signature is also updated.

Figure 15:
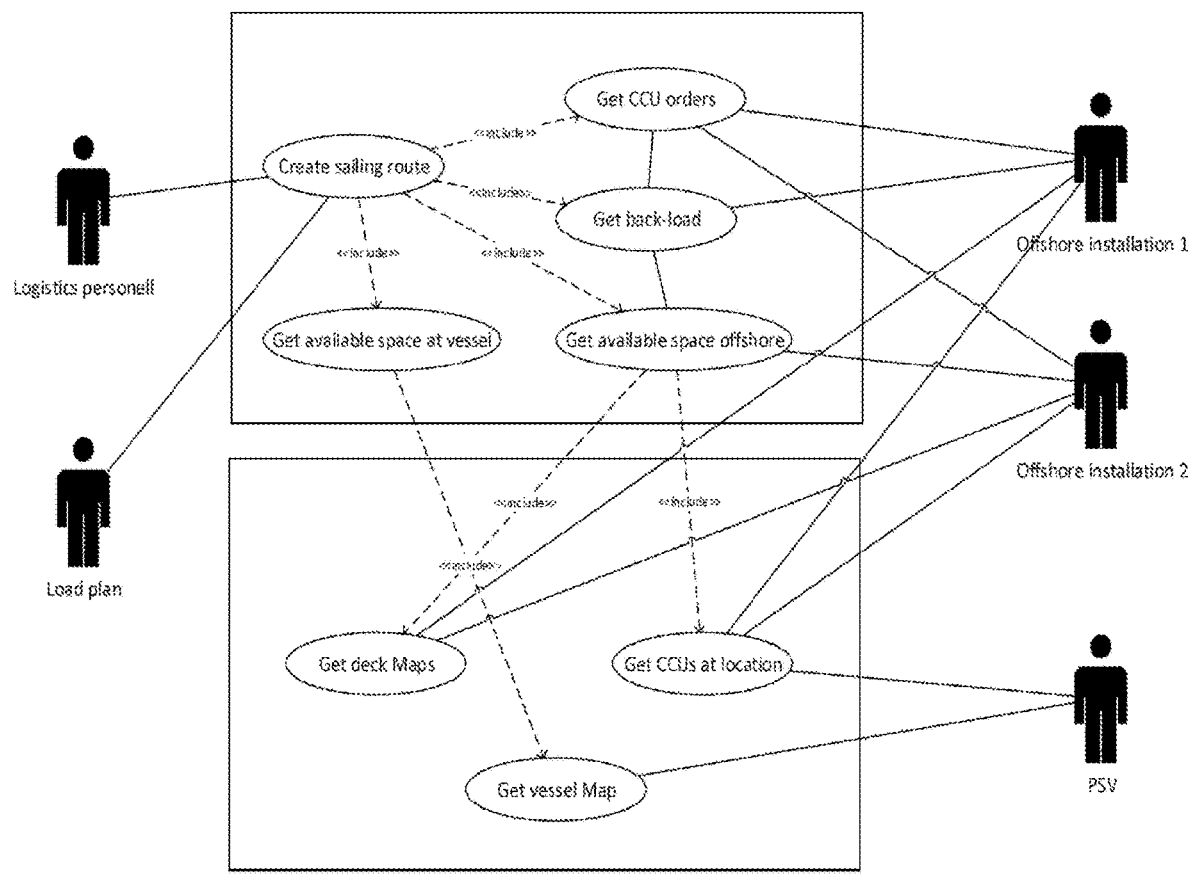

In FIG. 15 it is illustrated one possible scenario for planning a sailing route. The planning involves several entities, being one or more of: logistics personnel, a load plan, one or more offshore installations, and a PSV.

The planning is about creating an acceptable efficient sailing rout, and utilizing capacity of PSVs. Logistics personnel may receive shipping orders from several offshore installations or vessels, and comparing the orders and available space on the offshore installations, deck maps, and the PSV, vessel map, planned for executing the transport task, a number of CCUs may be identified for lift/transport.

When offshore installations planned for being visited on the sailing route is established, the logistic personnel may accept back-load requests from the offshore installations and allocate free space for this on the PSV when CCUs have been loaded to the offshore installation in question.

It is possible to view the task of creating a sailing route and creating a load plan as two separate tasks, wherein creating a load plan is part of present invention, the sailing route may be governed by many external factors, and although sailing plan influences the load plan, it is not necessarily the same the other way. Creating a load plan for the individual offshore installation and PSV involves retrieving deck maps and vessel map, and further to retrieve the registered latest updated location of CCUs planned to be lifted on or off the PSV.

Figure 16:
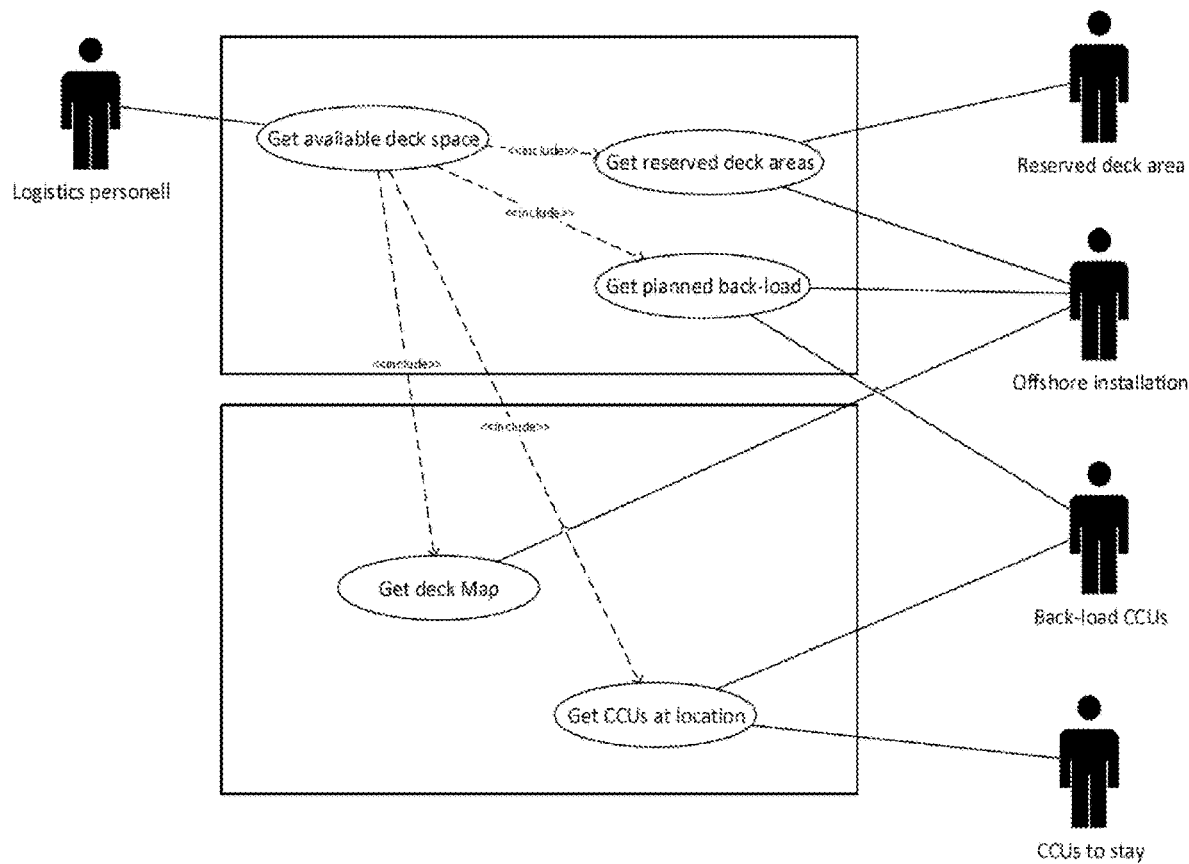

In a further use scenario as illustrated in FIG. 16, it is illustrated how logistic personnel can retrieve an estimate of available deck space on offshore installations.

Logistic personnel may by receiving current deck map from offshore installation, reserved deck areas plan, the planned back load and which CCUs are left on offshore installation estimate a realistic available deck space before and after planned PSV loading/unloading at offshore installation.

The invention is further defined by the following embodiment descriptions:

A first method embodiment for detection and tracking of a Cargo Carrying Unit, CCU, comprising the following steps:
  detecting, or creating for new CCUs, a unique CCU signature, wherein the unique CCU signature is constructed by analyzing images of the CCU capture by a sensor unit, and analyzing the images according to one or more of predefined detection methods, and the analysis providing a combination of one or more descriptors defined by CCU feature points, contours, dimensions, weight, colour, movement pattern, neighbour CCU feature point, planned travel route or last known location.

A second method embodiment for detection and tracking of a Cargo Carrying Unit according to the first method embodiment, wherein predefined detection methods comprising one or more of:
  feature-based-detection
  texture-based-detection
  position-based-detection, and
  pattern recognition by Artificial Intelligence, AI.

A third method embodiment for detection and tracking of a Cargo Carrying Unit according to the first or second method embodiment, wherein feature based detection comprising one of:
  SIFT, Scale invariant feature transform,
  FAST, Features from accelerated segment test, and
  ORB, Oriented FAST and rotated BRIEF, wherein for each initiated CCU the method comprises:
    1. finding the matches between the CCU and image feature descriptors
    2. computing the constrained transformation based on these matches using RANSAC followed by for example a Levenberg-Marquardt optimization
    3. computing the CCU feature inliers/outliers based on this transformation, and
    4. if the inliers are over a configurable threshold, OR the CCU is detected in the previous frame with a close position, wherein closeness is defined via defined thresholds, and there are for example at least three inliers, then adding the CCU into a detected list, and then, updating a CCU signature based on the inliers/outliers.

A fourth method embodiment for detection and tracking of a Cargo Carrying Unit according to the third method embodiment, wherein the CCU signature is updated according to the following:
  1. updating the total number of matched/unmatched frames for the existing and candidate feature points when;
    the feature point is located in the current image frame,
    the CCU with lower depths do not block the view of this point, and
    acquisition intensity of the point is not significantly different from the previously observed average, wherein that the CCU with lower depths do not block the view of the candidate feature point is found by checking the fused/final CCU detection results from previous frame for the rendering positions of CCUs with smaller depths,
  2. generating new candidate features by adding candidate feature points coming from either the inside of a CCU rectangle when a detection algorithm is set to "Rectangle", or from the inside of a hull defined by the inlier features when detection algorithm is set to "Hull",
  3. setting the feature points by pruning the feature points that are not matched over configurable number of frames, and the signature is grown with the candidate feature points that have been matched over a configurable number of frames.

A fifth method embodiment for detection and tracking of a Cargo Carrying Unit according to the second method embodiment, wherein texture based detection treats the CCU as a single feature where the descriptor is defined by the texture of the CCU, and the texture is defined during the tracking using the following selection criteria:
1. detecting the edges in the CCU rectangle using for example the Sobel gradients
2. sorting the detected edges with respect to their magnitudes
3. traversing the sorted list from top beginning from the highest magnitude, and keeping a configurable number of edges in the list with the constraint of kept edges cannot be closer than a configurable number of pixels to each other, and the final kept edges define the texture.

A sixth method embodiment for detection and tracking of a Cargo Carrying Unit according to the fifth method embodiment, wherein tracking is performed for a given image and cargo according to the following steps:
1. computing the Sobel gradient of the image
2. traversing all cargo edges for each pixel positions with gradient magnitude higher than a configurable threshold such that, by orienting the template to align the gradient directions and computing the fit for the rest of the contour points, the cargo edge is located on the pixel position, and
3. configuring the total acceptable alignment error such that the test of contour fitting onto a given position might take only few comparisons before aborting following false pixel positions.

A seventh method embodiment for detection and tracking of a Cargo Carrying Unit according to the second method embodiment, wherein position based detection comprising both detection process and updating process, wherein computing the cargo position with respect to the camera in detection process, based on a stored pose information according to any of the previous claims 3 to 6, and refining the cargo position with respect to the vessel and platform in update process.

An eighth method embodiment for detection and tracking of a Cargo Carrying Unit according to the seventh method embodiment, wherein the detection process is followed by the update process, and where the final detection results are used for refining each detected CCU's position with respect to the vessel and platform, wherein for each detected cargo, the updating process comprising the following steps:
1. resetting the CCU with respect to vessel, and CCU with respect to platform transformations
2. if the vessel is seen, computing the CCU with respect to vessel transformation as:

cargoWrtVessel=vesselWrtCamera$^{-1}$·cargoWrtCamera 3. if the platform is seen, computing the CCU with respect to platform transformation as:

cargoWrtPlatform=platformWrtCamera$^{-1}$·cargoWrtCamera

A ninth method embodiment for detection and tracking of a Cargo Carrying Unit according to the eighth method embodiment, wherein the detection process further uses the information refined in the update process to estimate the location of CCU with respect to vessel or platform, wherein for each CCU performing one of the following method steps:
1. if the vessel is seen, estimating the CCU's position with respect to camera as:

cargoWrtCamera=vesselWrtCamera·cargoWrtVessel 2. if the platform is seen, estimating the CCU's position with respect to camera as:

cargoWrtCamera=platformWrtCamera·cargoWrtPlatform.

A tenth method embodiment for detection and tracking of a Cargo Carrying Unit according to the first method embodiment, wherein the CCU signature is associated with a unique CCU ID stored in a logistic system, and if the CCU signature cannot be associated with a preregistered CCU ID: creating a new association between the CCU signature and a CCU ID found in the logistic system.

An eleventh method embodiment for detection and tracking of a Cargo Carrying Unit according to any of the first to tenth method embodiment, wherein the method further comprising updating position data associated with CCU ID in the logistic system according to last identified movement of CCU during tracking of the CCU.

A twelfth method embodiment for detection and tracking of a Cargo Carrying Unit according to any of the first to eleventh method embodiment, wherein the method further comprising using the sensor unit for recognizing and tracking, by pattern recognition, personnel on one of vessel deck or loading sites, and issuing a predefined warning level upon detecting personnel and CCU being on a crossing path.

A thirteenth method embodiment for detection and tracking of a Cargo Carrying Unit according to any of the first to twelfth method embodiment, wherein the method further comprising analyzing the images and recognizing one or more of characters, bar-codes or QR codes on a tag associated with the CCU, and further using this the tag information to increase accuracy in defining the CCU-signature.

A fourteenth method embodiment for detection and tracking of a Cargo Carrying Unit according to any of the first to thirteenth method embodiment, wherein the method further comprising detecting an RFID or GPS signal associated with the CCU, and further using the RFID or GPS signal information to increase accuracy in defining the CCU-signature.

A first system embodiment for detecting and tracking movement of CCUs in a logistic system, the system comprising:
at least one loading site comprising at least one crane having a sensor unit installed for capturing images of loading area below the crane,
at least one vessel able to carry CCUs between loading site facilities,
at least one loading site facility having at least one tool for loading CCUs to and from vessel, the loading site facility further comprising utilities for inputting CCU IDs of CCUs into a logistic system, a logistic system maintained in a network connected computer environment,
a data transmission network for connecting loading site facilities, and
each sensor unit is connected to a local computer resource for analyzing images captured by the sensor unit.

A second system embodiment for detecting and tracking movement of CCUs in a logistic system according to the first system embodiment, wherein the local computer resource further comprising a display unit for communicating images and for output and input of operation specific commands and parameters concerned with lifting operations, and the system further comprising storage resources at computer resources for storing communication data to provide later communication of data if transmission network are disconnected.

A third system embodiment for detecting and tracking movement of CCUs in a logistic system according to the first system embodiment, wherein the network computer environment comprise, at a site remote from the local computer resource, a display unit for communicating images and for output and input of operation specific commands and parameters concerned with lifting operations, and the system further comprising storage resources at computer resources for storing communication data to provide later communication of data if transmission network are disconnected.

A third system embodiment for detecting and tracking movement of CCUs in a logistic system according to any of the first or second system embodiment, wherein the system further comprise a server computer resource arranged at the loading site for communicating with each of the sensor units arranged in loading tool on the loading site, and wherein the logistic system is a third party logistic system, and an interface module is provided for communication between server computer resource and third party logistic system.

A fourth system embodiment for detecting and tracking movement of CCUs in a logistic system according to any of the first to third system embodiment, wherein the system further comprising in the logistic system a loading site map for each loading site comprising CCUs stored on the loading site, and a deck map of each vessel comprising CCUs stored on the deck of the vessel.

A fifth system embodiment for detecting and tracking movement of CCUs in a logistic system according to any of the first to fourth system embodiment, wherein the system further comprising one or more load plans for planned CCU transport between two or more of loading sites and storage facilities, each load plan comprising deck map of a vessel used in planned transport and loading site maps of loading sites planned visited during transport.

A sixth system embodiment for detecting and tracking movement of CCUs in a logistic system according to any of the first to fifth system embodiment, wherein the system further comprising one or more of OCR module, bar- or QR-code decoding module, for recognizing information from a tag associated with a CCU.

A seventh system embodiment for detecting and tracking movement of CCUs in a logistic system according to any of the first to sixth system embodiment, wherein the system further comprising one or more of an RFID or GPS communication module, for receiving information from an RFID or GPS communication module associated with a CCU.

An eighth system embodiment for detecting and tracking movement of CCUs in a logistic system according to any of the first to seventh system embodiment, wherein the server computer resource and/or the local computer resource comprise resources for detection and tracking of CCU, according to any of the first to fourteenth method embodiment for detection and tracking of a Cargo Carrying Unit.

A first Sensor unit assembly (1) embodiment for capturing images and video sites and objects, the sensor unit comprising:
- a sensor unit (2) comprising one or more sensors (3, 4, 5), attachment means (7),
- a connector box (6) comprising power means and connectors for external wiring and/or communication means for wired or wireless communication with the server computer resource and/or the local computer resource,
- connectors and cabling (8) for connecting the sensors (3, 4, 5) to the connector box (6), wherein at least one sensor (3, 4, 5) is a camera.

A second Sensor unit assembly (1) embodiment according to the first Sensor unit assembly (1) embodiment, wherein at least one sensor is a heat sensitive camera.

The invention claimed is:

1. A method for detecting and identifying a Cargo Carrying Unit (CCU), comprising:
providing a sensor for capturing images of a loading area below a loading tool,
capturing an image of a target region comprising the CCU by the sensor, the image being a current frame,
providing a plurality of previously registered CCUs, each of the previously registered CCUs is identified by a unique CCU signature, a target signature, comprising a set of feature points and further corresponding descriptors associated with the CCU, wherein the descriptors being defined by at least CCU 3D feature points and the feature points being detected in a target template selected from the image comprising the CCU,
providing a server computer resource and/or a local computer resource,
using the server computer resource and/or the local computer resource for:
communicating with the sensor;
the server computer resource and/or the local computer resource being configured for computing a current unique CCU signature for the CCU comprised in the current frame, wherein the current unique CCU signature, being a combination of one or more feature points and further corresponding descriptors, according to a feature-point-detection and matching method comprising:
detecting feature points in the current frame,
computing further descriptors for the feature points in the current frame, and
matching the detected feature points with the feature points detected in one of the plurality of previously registered target templates,
the method further comprising:
providing a current 3D position and orientation of an object defined by the matched feature points by pose estimation of the matched feature points,
comparing the current unique CCU signature of the CCU comprised in the target region with unique CCU signatures in the plurality of previously registered CCUs, and
determining if the CCU comprised in the target region:
is recognised in the plurality of previously registered unique CCUs, wherein the recognition is defined by checking if a number of inliers from the pose estimation is above a configurable threshold, or
is not recognised in the plurality of previously registered unique CCUs.

2. The method according to claim 1, further comprising detection and tracking of a Cargo Carrying Unit using one or more of:
texture-based detection
position-based detection, and
pattern recognition by Artificial Intelligence, AI.

3. The method according to claim 2, wherein position-based detection comprises both detection process and updating process, wherein the method further comprises:
computing a position of the CCU with respect to the sensor, being a camera, in detection process, based on a stored pose information, and
refining the CCU position with respect to a vessel and platform in the update process.

4. The method according to claim 1, further comprising one or more of:
the current unique CCU signature is associated with a unique CCU ID stored in a logistic system, and if the current unique CCU signature cannot be associated with a preregistered CCU ID:

creating a new association between the current unique CCU signature and a CCU ID found in the logistic system, updating position data associated with current CCU ID in the logistic system according to a last identified movement of CCU, using the sensor for recognizing, by pattern recognition, personnel on one of vessel deck or loading sites, and issuing a predefined warning level upon detecting personnel and CCU being on a crossing path, analyzing the image and recognizing one or more of characters, bar-codes or QR codes on a tag associated with the CCU, and further using information of the tag to increase accuracy in defining the current unique CCU signature, detecting an RFID or GPS signal associated with the CCU, and further using the RFID or GPS signal information to increase accuracy in defining the current CCU-signature.

5. A system for detecting and identifying Cargo Carrying Units (CCU), the system comprising:

at least one loading site facility comprising at least one lifting/moving tool having a sensor unit installed for capturing images of loading area below the lifting/moving tool;

the loading site facility further comprising utilities for inputting a CCU ID of a CCU into a logistic system, wherein the CCU is identified by a unique CCU signature, a target signature, comprising a set of feature points and further corresponding descriptors associated with the CCU, wherein the descriptors being defined by at least CCU 3D feature points and the feature points being detected in a target template selected from the image comprising the CCU;

the logistic system is maintained in a network connected computer environment;

a data transmission network for connecting loading site facilities; and each sensor unit is connected to a local computer resource for analyzing images captured by the sensor unit, and/or a server computer resource arranged at the loading site facility for communicating with each of the sensor units arranged in loading tool on the loading site facility; and the server computer resource and/or the local computer resource comprise resources for detection and tracking of the CCU, wherein the server computer resource and/or the local computer resource being configured for computing a current unique CCU signature for the CCU comprised in a current frame, wherein the current unique CCU signature, being a combination of one or more feature points and further corresponding descriptors, according to a feature-point-detection and matching method comprising:

detecting feature points in the current frame, computing further descriptors for the feature points in the current frame, and matching the detected feature points with the feature points detected in one of a plurality of previously registered target templates.

6. The system according to claim 5, wherein the local computer resource further comprising a display unit for communicating the images and for outputting and inputting operation specific commands and parameters concerned with lifting operations, and the system further comprising storage resources at computer resources for storing communication data to provide later communication of data if the transmission network is disconnected.

7. The system according to claim 5, wherein the computer environment comprise, at a site remote from the local computer resource, a display unit for communicating the images and for outputting and inputting operation specific commands and parameters concerned with lifting operations, and the system further comprising storage resources at computer resources for storing communication data to provide later communication of data if the transmission network is disconnected.

8. The system according to claim 5, wherein the logistic system is a third party logistic system, and an interface module is provided for communication between the server computer resource and the third party logistic system.

9. The system according to claim 5, wherein the system further comprising in the logistic system a loading site map for each loading site comprising CCUs stored on the loading site, and a deck map of each vessel comprising CCUs stored on the deck of the vessel.

10. The system according to claim 5, further comprising one or more load plans for a planned CCU transport between two or more of loading sites and storage facilities, each load plan comprising deck map of a vessel used in planned transport and loading site maps of loading sites planned visited during transport.

11. The system according to claim 5, further comprising one or more of OCR module, bar- or QR-code decoding module, for recognizing information from a tag associated with the CCU.

12. The system according to claim 5, further comprising one or more of an RFID or GPS communication module, for receiving information from an RFID or GPS communication module associated with the CCU.

13. A sensor unit assembly for capturing images and video of sites and objects, comprising:

one or more sensors;

attachment means;

a connector box comprising a power source and connectors for external wiring and/or communicator for wired or wireless communication with a server computer resource and/or a local computer resource;

connectors and cabling for connecting the one or more sensors to the connector box;

wherein:

at least one sensor is a camera the server computer resource and/or the local computer resource comprise resources for detection and identifying a Cargo Carrying Units, CCU, the CCU identified by a unique CCU signature, a target signature, comprising a set of feature points and further corresponding descriptors associated with the CCU, the descriptors being defined by at least CCU 3D feature points and the feature points being detected in a target template selected from the image comprising the CCU; and the server computer resource and/or the local computer resource being configured for computing a current unique CCU signature for the CCU comprised in a current frame, wherein the current unique CCU signature, being a combination of one or more feature points and further corresponding descriptors, according to a feature-point-detection and matching method comprising:

detecting feature points in the current frame;

computing further descriptors for the feature points in the current frame; and matching the detected feature points with the feature points detected in one of a plurality of previously registered target templates.

14. The sensor assembly according to claim 13, wherein at least one sensor is a heat sensitive camera.

15. The sensor assembly according to claim 13, further comprising one or more of: an infra-red, IR, sensor, a laser camera, a lidar, or a radar.

16. The sensor assembly according to claim 13, further comprising one or more of Optical Character Recognition, OCR, module, bar- or QR-code decoding module.

17. The sensor assembly according to claim 13, further comprising one or more of an RFID or GPS communication module.

18. The sensor assembly according to claim 13, wherein the sensor assembly is attached to the frame via a rotation frame comprising rotational movement means and bearing means.

19. The method according to claim 1, wherein the pose estimation of the matched feature points comprising:
- finding an initial pose (Rotation, Translation) that has the most inliers according to a threshold for a re-projection error;
- extracting the inliers (2D/3D correspondences) for the initial pose (Rotation, Translation); and
- refining the pose (Rotation, Translation) by a nonlinear optimization that minimize the re-projection error, wherein only the inliers are used in the minimization, and the initial pose (Rotation, Translation) is set as starting point.

20. The method according to claim 19, further comprising when determining if the CCU comprised in the target region:
- is recognised in the plurality of previously registered unique CCUs, wherein the recognition is defined by checking if the number of inliers from the pose estimation is above the configurable threshold:
  - remove frequently unmatched feature points from the unique CCU signature,
  - remove feature points that are frequently considered to be outliers by the current pose estimator,
  - add frequently detected feature points that is not already part of the target signature, or
- is not recognised in the plurality of previously registered unique CCUs, then:
  - provide the CCU for an optional inclusion in the plurality of previously registered unique CCUs.

21. A system for detecting and identifying Cargo Carrying Units (CCU), the system comprising:
- at least one loading site facility comprising at least one lifting/moving tool having a sensor unit installed for capturing images of loading area below the lifting/moving tool,
- the loading site facility further comprising utilities for inputting a CCU ID of a CCU into a logistic system,
- the logistic system is maintained in a network connected computer environment,
- a data transmission network for connecting loading site facilities, and
- each sensor unit is connected to a local computer resource for analyzing images captured by the sensor unit, and/or
- a server computer resource arranged at the loading site facility for communicating with each of the sensor units arranged in loading tool on the loading site facility; and
- the server computer resource and/or the local computer resource comprise resources for detection and tracking of the CCU;
- wherein the system is configured to detect and identify the CCU in accordance with the method of claim 1.

* * * * *